(12) United States Patent
Jacobus et al.

(10) Patent No.: US 7,747,339 B2
(45) Date of Patent: Jun. 29, 2010

(54) MANAGING PROCUREMENT RISK

(75) Inventors: Greg C. Jacobus, Campbell, CA (US); Thomas D. Olavson, San Francisco, CA (US); Venu Nagali, Westampton, NJ (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2343 days.

(21) Appl. No.: 10/264,474

(22) Filed: Oct. 3, 2002

(65) Prior Publication Data
US 2004/0068454 A1 Apr. 8, 2004

(51) Int. Cl.
*G06F 19/00* (2006.01)
(52) U.S. Cl. .......................... 700/99; 705/10; 705/402
(58) Field of Classification Search ................ 705/6–8, 705/10, 28, 402; 700/99, 106
See application file for complete search history.

(56) References Cited

U.S. PATENT DOCUMENTS

| | | | | |
|---|---|---|---|---|
| 5,216,612 A * | 6/1993 | Cornett et al. ................ 700/96 |
| 5,287,267 A | 2/1994 | Jayaraman et al. |
| 5,459,656 A * | 10/1995 | Fields et al. .................... 705/7 |
| 5,712,985 A * | 1/1998 | Lee et al. ........................ 705/7 |
| 5,953,707 A * | 9/1999 | Huang et al. .................. 705/10 |
| 5,963,919 A * | 10/1999 | Brinkley et al. ............... 705/28 |
| 5,974,403 A * | 10/1999 | Takriti et al. ................ 705/412 |
| 6,006,192 A | 12/1999 | Cheng et al. |
| 6,324,522 B2 * | 11/2001 | Peterson et al. ............... 705/28 |
| 6,393,332 B1 * | 5/2002 | Gleditsch et al. ............. 700/99 |
| 6,415,194 B1 * | 7/2002 | Gleditsch et al. ............. 700/99 |
| 6,829,590 B1 * | 12/2004 | Greener et al. ................ 705/38 |
| 6,931,347 B2 * | 8/2005 | Boedi et al. .................. 702/137 |
| 7,024,383 B1 * | 4/2006 | Mancini et al. ............... 705/35 |
| 7,089,196 B2 * | 8/2006 | Hayes .......................... 705/22 |
| 7,120,596 B2 * | 10/2006 | Hoffman et al. .............. 705/28 |
| 7,130,807 B1 * | 10/2006 | Mikurak ......................... 705/7 |
| 7,149,739 B1 * | 12/2006 | Dose et al. ................... 707/100 |
| 7,373,371 B2 * | 5/2008 | Eck et al. ...................... 705/29 |
| 7,376,600 B1 * | 5/2008 | Wadawadigi et al. .......... 705/28 |
| 7,430,534 B2 * | 9/2008 | Lof et al. ....................... 705/37 |
| 7,552,065 B1 * | 6/2009 | Blanco ......................... 705/10 |
| 7,577,606 B1 * | 8/2009 | Ford ............................. 705/37 |
| 7,634,441 B2 * | 12/2009 | Alvarado et al. .............. 705/37 |
| 7,634,442 B2 * | 12/2009 | Alvarado et al. .............. 705/38 |
| 7,634,443 B2 * | 12/2009 | Alvarado et al. .............. 705/38 |
| 7,634,449 B2 * | 12/2009 | Alvarado et al. ............ 705/412 |

OTHER PUBLICATIONS

Vivecon Solutions: Software, w w w .vivecon.com, 2002.
Vivecon Solutions: Overview, w w w .vivecon.com, 2002.
Corey Billington et al., "Creating and Leveraging Options in the High Technology Supply Chain," POM Society, (Apr. 2002).

* cited by examiner

*Primary Examiner*—Andrew Joseph Rudy

(57) ABSTRACT

Systems and methods for managing procurement risk are described. In accordance with a procurement risk management method, a resource sourcing mix is computed from a sourcing portfolio of one or more forward contracts, spot market purchases, and inventory depletion for each period of a planning horizon based on forecast scenarios for resource demand, resource price, and resource availability and a specified inventory carrying policy for the resource. Based upon the computed resource sourcing mix, one or more metrics for evaluating the sourcing portfolio are computed. A system and a computer program implementing the above-described procurement risk management method also are described.

45 Claims, 22 Drawing Sheets

FIG. 5

HP Risk 2.0

Help | About
New | Open | Save

Default: @ Market

Tabs: Inputs / Forecasting Inputs / Sourcing Portfolio / Financial Inputs / Reports
- Summary Information / Time Periods / Notes
- Demand / Price / Availability / Scenario Correlations
- @ Market / Sourcing Option 1 / Sourcing Option 2 / Inventory Policy
- Discount Rate / Shortage Cost / Product Margin / Inventory Salvage Value
- Material Shortage / Inventory Cashflow #'s / Total / Margin / Purchases

Sourcing Option 1 (RESET)

| | |
|---|---|
| Type | Contract |
| Name | HP AMD LTA |
| Status | Approved |

Contract Term — Supplier Name: AMD

| Description | | M1 | M2 | M3 | M4 | M5 | M6 | M7 | M8 | M9 | M10 | M11 | M12 |
|---|---|---|---|---|---|---|---|---|---|---|---|---|---|
| Quantity type | Flexible quantity | | | | | | | | | | | | |
| Max quantity available (cap) | units / period | AutoFill 706,000 | 706,000 | 706,000 | 706,000 | 706,000 | 706,000 | | | | | | |
| Min quantity commitment (floor) | units / period | AutoFill 517,000 | 517,000 | 517,000 | 517,000 | 517,000 | 517,000 | | | | | | |
| Price type | Pre-specified price schedule | | | | | | | | | | | | |
| Price | $ / unit | AutoFill $2.00 | $2.00 | $2.00 | $2.00 | $2.00 | $2.00 | | | | | | |
| Price Cap | NA | AutoFill | | | | | | | | | | | |
| Price Floor | NA | AutoFill | | | | | | | | | | | |
| Additional cash payments | $ / period | AutoFill $60K | $60K | $60K | $60K | $60K | $60K | | | | | | |

Notes

Sourcing Option 2 (RESET)

| | |
|---|---|
| Type | Contract |
| Contract Name | Hypothetical |
| Contract Status | |

Contract Term — Supplier Name:

| Description | | M1 | M2 | M3 | M4 | M5 | M6 | M7 | M8 | M9 | M10 | M11 | M12 |
|---|---|---|---|---|---|---|---|---|---|---|---|---|---|
| Quantity type | Flexible quantity | | | | | | | | | | | | |
| Max quantity available (cap) | units / period | AutoFill 0 | 0 | 0 | 0 | 0 | 0 | 370,000 | 370,000 | 370,000 | 370,000 | 370,000 | 370,000 |
| Min quantity commitment (floor) | units / period | AutoFill 0 | 0 | 0 | 0 | 0 | 0 | 150,000 | 150,000 | 150,000 | 150,000 | 150,000 | 150,000 |
| Price type | % of market price | | | | | | | | | | | | |
| Price | % below scenario price | AutoFill 0.0% | 0.0% | 0.0% | 0.0% | 0.0% | 0.0% | 5.5% | 5.5% | 5.5% | 5.5% | 5.5% | 5.5% |
| Price Cap | NA | AutoFill | | | | | | | | | | | |
| Price Floor | NA | AutoFill | | | | | | | | | | | |
| Additional cash payments | $ / period | AutoFill $0K | $0K | $0K | $0K | $0K | $0K | $15K | $15K | $15K | $15K | $15K | $15K |

Notes

Advanced Settings: Inventory/Carrying Policy

FIG. 7

| | | | | | | | | | |
|---|---|---|---|---|---|---|---|---|---|
| | | | | | Product | Forecast Inputs | Sourcing Portfolio | Financial Inputs | Reports |
| | Help | New | | | Summary Information | Demand | @ Market: | Discount Rate | Material |
| | About | Open | | | Time Periods | Price | Sourcing Option 1 | Shortage Cost | Shortage |
| HP Risk 2.0 | | Save | | | Notes | Availability | Sourcing Option 2 | Product Margin | Inventory |
| | | | | | | Scenario Correlations | Inventory Policy | Inventory Salvage Value | Cashflows |
| | | | | | | | | | Total |
| Sourcing Costs | Calculate | | | Portfolio | | @ Market | | @ Market -> Portfolio Change | |
| Material Cost | | | | | | | | | |
| High Scenario NPV | | | | $19,606K | | $22,142K | | -11.5% | |
| Expected NFV | | | | $11,619K | | $11,813K | | 1.7% | |
| Low Scenario NPV | | | | $7,906K | | $5,647K | | 40.0% | |
| Shortage Cost | | | | | | | | | |
| High Scenario NPV | | | | $443,740 | | $896,886 | | 50.7% | |
| Expected NFV | | | | $79,125 | | $260,230 | | -69.5% | |
| Low Scenario NPV | | | | $0 | | $0 | | 0.0% | |
| Inventory Cost | | | | | | | | | |
| High Scenario NPV | | | | $10,128 | | n/a | | n/a | |
| Expected NFV | | | | -$377,474 | | n/a | | n/a | |
| Low Scenario NPV | | | | -$1,505,209 | | n/a | | n/a | |
| Other Cashflows | | | | | | | | | |
| NPV | | | | $471K | | n/a | | n/a | |
| Total Cost | | | | Portfolio | | @ Market | | @ Market -> Portfolio Change | |
| High Scenario NPV | | | | $20,077K | | $22,142K | | -9.3% | |
| Expected NFV | | | | $11,791K | | $12,073K | | -2.4% | |
| Low Scenario NPV | | | | $7,155K | | $5,647K | | 26.9% | |
| Chance of higher total cost than @market | | | | 63.8% | | n/a | | n/a | |
| Advanced Reports | | | | | | | | | |
| Margin | | | | | | | | | |
| High Scenario NPV | | | | $347K | | $1,794K | | -52.8% | |
| Expected NFV | | | | -$486K | | -$826K | | 41.7% | |
| Low Scenario NPV | | | | -$3,118K | | -$5,188K | | 39.8% | |
| Chance of lower margin than @market | | | | 33.1% | | n/a | | n/a | |
| Purchase Quantities | | | | | | | | | |

84 — Sourcing Costs
86 — Shortage Cost
88 — Inventory Cost
90 — Other Cashflows
92 — Total Cost

| Excess Inventory Salvage Value as % of Scenario Price | | | | |
|---|---|---|---|---|
| | Q1 | Q2 | Q3 | Q4 |
| Low Recovery | 80% | 80% | 80% | 80% |
| Base Recovery | 90% | 90% | 90% | 90% |
| High Recovery | 100% | 100% | 100% | 100% |

| Inventory Carrying Policy | | | | |
|---|---|---|---|---|
| Starting inventory level | 750 | | | |
| | Q1 | Q2 | Q3 | Q4 |
| Maximum allowable inventory | 2000 | 1500 | 1000 | 1000 |
| Target buffer stock | 500 | 400 | 300 | 200 |
| Risk-free discount rate for finance charges (annual) | 1.76% | | | |
| Storage cost (annual) | 0.50% | | | |

| Average Product Margin/Unit Input see note here about Units | | | | |
|---|---|---|---|---|
| | Q1 | Q2 | Q3 | Q4 |
| High Demand Margin | $0.00 | $0.00 | $0.00 | $0.00 |
| Base Demand Margin | $0.00 | $0.00 | $0.00 | $0.00 |
| Low Demand Margin | $0.00 | $0.00 | $0.00 | $0.00 |
| Shortage cost per unit see note here about shortage cost types | | | | |
|---|---|---|---|---|
| | Q1 | Q2 | Q3 | Q4 |
| ▼ | $0.00 | $0.00 | $0.00 | $0.00 |
150 — lost margin / fixed cost/unit adder / price multiplier
FIG. 22B
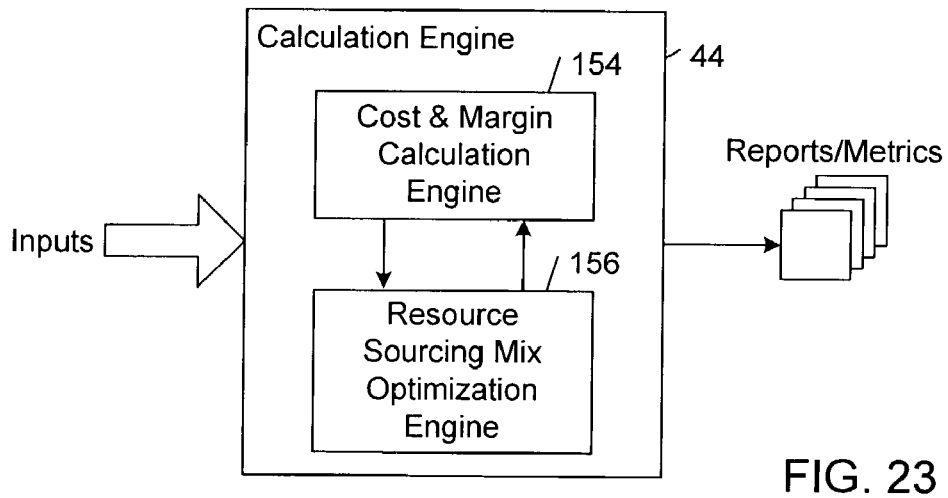
FIG. 23
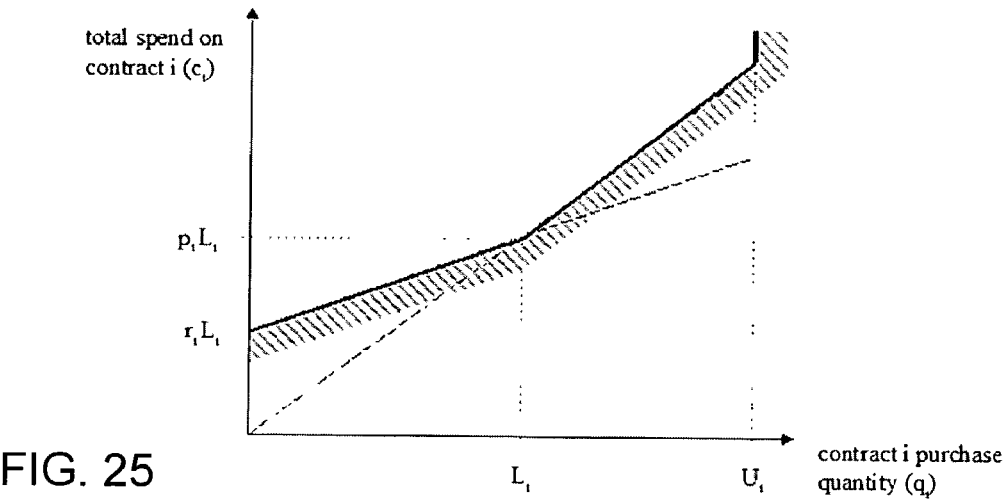
FIG. 25

FIG. 32

Sourcing Option 1 [RESET]

| Type | Contract | Supplier Name | Supplier A |
|---|---|---|---|
| Name | Fixed Qty and Price | | |
| Status | Pending approval | | |

| Contract term | Description | | Qtr1 | Qtr2 | Qtr3 | Qtr4 |
|---|---|---|---|---|---|---|
| Quantity type | Fixed quantity | | | | | |
| Max quantity available (cap) | units / period | AutoFill | 100,000 | 95,000 | 80,000 | 75,000 |
| Min quantity commitment (floor) | units / period | AutoFill | 100,000 | 95,000 | 80,000 | 75,000 |
| Price type | Pre-specified price schedule | | | | | |
| Price | $ / unit | AutoFill | $4.75 | $4.00 | $3.25 | $3.00 |
| Price Cap | NA | AutoFill | | | | |
| Price Floor | NA | AutoFill | | | | |
| Additional cash payments | $ / period | AutoFill | $0K | $0K | $0K | $0K |

▷ Notes

Sourcing Option 2 [RESET]

| Type | Contract | Supplier Name | Supplier B |
|---|---|---|---|
| Contract Name | Flex Qty and Fixed Price | | |
| Contract Status | Pending approval | | |

| Contract term | Description | | Qtr1 | Qtr2 | Qtr3 | Qtr4 |
|---|---|---|---|---|---|---|
| Quantity type | Flexible quantity | | | | | |
| Max quantity available (cap) | units / period | AutoFill | 0 | 45,000 | 55,000 | 60,000 |
| Min quantity commitment (floor) | units / period | AutoFill | 0 | 0 | 0 | 0 |
| Price type | Pre-specified price schedule | | | | | |
| Price | $ / unit | AutoFill | $5.10 | $4.75 | $4.50 | $4.50 |
| Price Cap | NA | AutoFill | | | | |
| Price Floor | NA | AutoFill | | | | |
| Additional cash payments | $ / period | AutoFill | $0K | $0K | $0K | $0K |

▷ Notes

FIG. 33

| ▽ ▷ Sourcing Costs [Calculate] | Portfolio | @ Market | @ Market --> Portfolio Change |
|---|---|---|---|
| ▷ Material Cost | | | |
| High Scenario NPV | $2,232K | $2,488K | -10.3% |
| Expected NPV | $1,626K | $1,715K | -5.2% |
| Low Scenario NPV | $1,222K | $1,076K | 13.5% |
| ▽ Shortage Cost | | | |
| High Scenario NPV | $53,295 | $354,270 | -85.0% |
| Expected NPV | $21,564 | $131,984 | -83.7% |
| Low Scenario NPV | $0 | $0 | 0.0% |
| ▷ Graph Over Time | | | |
| ▷ Distribution of NPV | | | |
| ▷ Distribution of Improvement Over @Market | | | |
| ▽ Shortage Units | | | |
| High Scenario | 16,562 | 108,338 | -84.7% |
| Expected | 4,763 | 31,972 | -85.1% |
| Low Scenario | 0 | 0 | 0.0% |
| ▷ Inventory Cost | | | |
| High Scenario NPV | $134 | n/a | n/a |
| Expected NPV | $34 | n/a | n/a |
| Low Scenario NPV | $0 | n/a | n/a |
| ▷ Other Cashflows | | | |
| NPV | $0 | n/a | n/a |
| ▷ Total Cost | | | |
| High Scenario NPV | $2,284K | $2,842K | -19.6% |
| Expected NPV | $1,648K | $1,847K | -10.8% |
| Low Scenario NPV | $1,222K | $1,118K | 9.3% |
| Chance of higher total cost than @market | 23.1% | n/a | n/a |

MANAGING PROCUREMENT RISK

TECHNICAL FIELD

This invention relates to systems and methods of managing procurement risk.

BACKGROUND

Asset managers of large manufacturing enterprises, for example, computer manufacturers, electronics manufacturers and auto manufacturers, must determine the inventory levels of components and finished products that are needed to meet target end customer service levels (i.e., the fraction of customer orders that should be received by the requested delivery dates). For such manufacturing enterprises, the delivery of a finished product to an end customer typically involves a complex network of suppliers, fabrication sites, assembly locations, distribution centers and customer locations through which components and products flow. This network may be modeled as a supply chain that includes all significant entities participating in the transformation of raw materials or basic components into the finished products that ultimately are delivered to the end customer.

Manufacturing enterprises must arrange for the delivery of component parts that are needed to produce the finished products to be delivered to end customers. In general, manufacturing enterprises may purchase component parts on the market at the market rate or they may enter into forward supply contracts in which settlement takes place in the future at a currently agreed upon price or a pre-defined price mechanism such as a price indexed to other external or internal prices. In a forward supply contract, the contract details are agreed upon at the outset, but no commodities are exchanged until the settlement (delivery) date. Money is also typically not exchanged until the settlement, though the agreement may include upfront option payments or loans to the supplier. In commodity component markets, commodity suppliers typically observe large discrepancies between forecasted demand and actual demand and, therefore, are unable to accurately schedule plant capacity and reduce inventory risk. In these situations, commodity suppliers may be willing to accept lower future prices in exchange for large future purchasing commitments because these future purchasing commitments increase the proportion of forecasted demand that will be realized, reducing inventory or capacity utilization risk. Manufacturers may benefit if the future contract cost is lower than the future market price. In addition, manufacturers may also benefit from the increased price predictability provided by future supply contracts, if fixed price or price cap agreements help protect the manufacturers' margin from possible component price increases. Finally, manufacturers may benefit from the assurance of supply provided by the contract agreements that help prevent costly shortages. When assurance of supply is important and supplier flexibility is costly, manufacturers may even structure contract terms to pay upfront option payments or higher unit prices for the rights to purchase flexible quantities above and beyond the committed quantities. Uncertainties in demand, market price, or market availability, however, make valuing contract options difficult, especially when a number of contract options are considered together as a sourcing portfolio. The uncertainties also may create substantial liabilities for manufacturers when entering into future supply contracts, since demand may be less than the committed quantity, or market price may decline to less than the contract price.

SUMMARY

The invention features systems and methods for managing procurement risk.

In one aspect, the invention features a procurement risk management method. In accordance with this inventive method, a resource sourcing mix is computed from a sourcing portfolio of one or more forward contracts, spot market purchases, and inventory depletion for each period of a planning horizon based on forecast scenarios for resource demand, resource price, and resource availability and a specified inventory carrying policy for the resource. Based upon the computed resource sourcing mix, one or more metrics for evaluating the sourcing portfolio are computed.

The invention also features a system and a computer program implementing the above-described procurement risk management method.

Other features and advantages of the invention will become apparent from the following description, including the drawings and the claims.

DESCRIPTION OF DRAWINGS

FIG. 5 is the graphical user interface of FIG. 3 presenting elements of a specified sourcing portfolio.

FIG. 7 is the graphical user interface of FIG. 3 presenting multiple reports for evaluating risk in the specified sourcing portfolio.

FIG. 19B is a graphical user interface through which a user may specify a degree of price-demand correlation and visualize the impact of such correlation as a scenario tree.

FIG. 20A is a graphical user interface through which a user may specify resource availability as a percentage of demand in each demand scenario.

FIG. 20B is a graphical user interface through which a user may specify resource availability as a percentage of demand in each price scenario.

FIG. 21A is a graphical user interface through which a user may specify sourcing portfolio inputs into a procurement risk calculation engine.

FIG. 21B is a graphical user interface for specifying an inventory carrying policy and excess salvage as a percentage of scenario price.

FIG. 22A is a graphical user interface through which a user may specify financial inputs into the procurement risk calculation engine.

FIG. 22B is a graphical user interface for specifying shortage cost type, shortage cost per unit, and average product margin/unit input.

FIG. 23 is a block diagram of a procurement risk calculation engine.

FIG. 25 is a graph of total cost spent on a contract plotted as a function of purchase quantity.

FIG. 32 is a graphical user interface presenting terms of a fixed quantity contract and a flexible quantity contract.

FIG. 33 is a graphical user interface presenting multiple output metrics for evaluating a hypothetical sourcing portfolio based on the contracts of FIG. 32.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

I. Operating Environment

Figure 1:
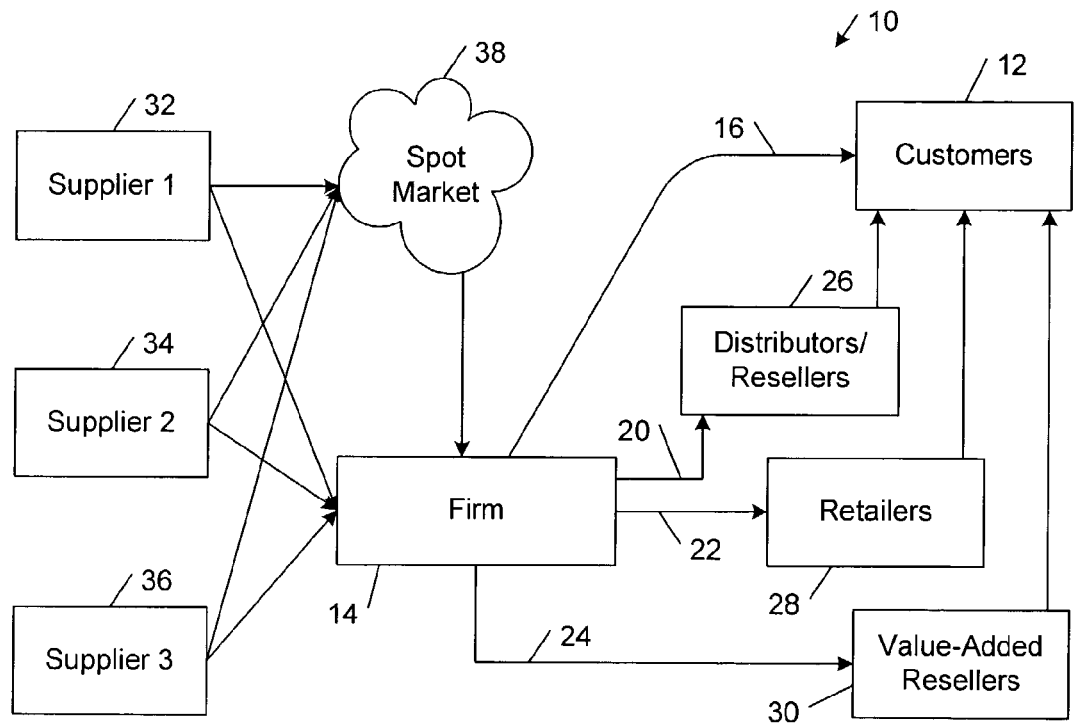
FIG. 1 is a block diagram of an exemplary supply chain that includes multiple suppliers and a firm that sells products to customers directly and indirectly through a supply channel that includes distributors (or resellers), retailers, and valued-added resellers.

Referring to FIG. 1, in one illustrative embodiment, a simplified distribution system (or supply chain) 10 includes a set of end customers 12 expressing a cumulative demand level for a particular set of goods (or products) that drives the production of those goods. The goods are produced by a firm 14 that sells products 16 to customers 12 directly and that sells products 20, 22, 24 to customers 12 indirectly through a supply channel that includes distributors (or resellers) 26, retailers 28, and valued-added resellers 30. Firm 14 may include a manufacturing line that is configured to assemble a plurality of products from component parts (or raw materials) that may be supplied directly from one or more component part suppliers 32, 34, 36 or indirectly through a spot market 38.

In operation, end customer demand drives orders, which are satisfied by shipments of products from inventories that are stored at various locations in the supply chain. Production planners for firm 14 schedule the delivery of finished goods so that the inventory levels are sufficient to cover both expected end customer demand and uncertainty in end customer demand. In general, various demand forecasting techniques may be used to project future demand by end customers 12 for finished goods. As explained in detail below, based on forecasted demand levels, as well as price and availability forecasts, production planners may evaluate and manage the risks associated with various component procurement strategies to obtain an optimal sourcing mix for one or more of the component parts that are needed to manufacture the products sold to end customers 12. The procurement risk management approach described below supports strategic sourcing decisions by evaluating procurement alternatives to lower sourcing costs and risks. The functionality of this procurement risk and contract valuation solution enables the measurement and management of procurement uncertainties using tailored sourcing arrangements.

II. System Overview

Figure 2:
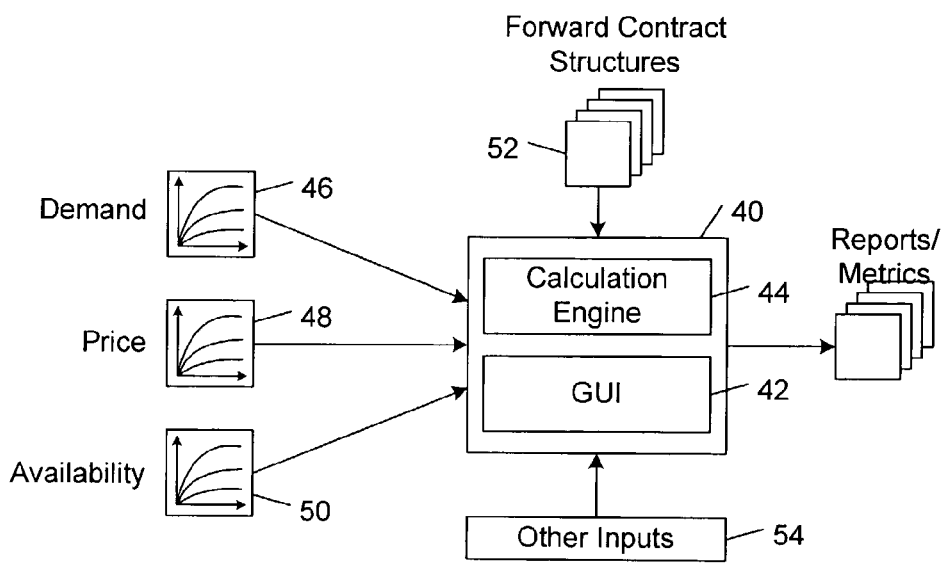
FIG. 2 is a diagrammatic view of a procurement risk management system.

Referring to FIG. 2, in one embodiment, a procurement risk management system 40 may be implemented as follows. Procurement risk management system 40 may include a graphical user interface 42 and a calculation engine 44. Graphical user interface 42 provides a convenient and efficient way for a user (e.g., a production planner) to enter data into the demand forecasting system 40, to visualize the results of various sourcing strategies, and to readily modify a sourcing strategy. Calculation engine 44 operates upon data received from the user and data contained within data structures stored in various database tables. Among the types of data received are forecast scenarios for resource demand 46, resource price 48 and resource availability 50, a set of one or more forward contract structures 52 each specifying terms of a respective forward contract for procuring a resource, and other inputs 54. As explained in detail below, calculation engine 44 is operable to compute a resource sourcing mix based on the received data and to compute one or more metrics for evaluating risk in a sourcing portfolio based on the computed sourcing mix. In particular, calculation engine 44 is operable to measure the risks in a sourcing portfolio or strategy, enable the management of these risks, and to determine the value and optimal draw down of sourcing contracts in a given portfolio.

Procurement risk management system 40 may be implemented as one or more respective software modules operating on a computer. In one embodiment, the procurement risk management system 40 may be implemented as a Microsoft® Access® Database utilizing Visual Basic® for Applications (VBA) computer program operable as a spreadsheet tool in the Microsoft® Excel® application program, which is operable on a personal computer or a workstation. In general, the computer (or workstation) includes a processing unit, a system memory, and a system bus that couples the processing unit to the various components of the computer. The processing unit may include one or more processors, each of which may be in the form of any one of various commercially available processors. The system memory typically includes a read only memory (ROM) that stores a basic input/output system (BIOS) that contains start-up routines for the computer, and a random access memory (RAM). The system bus may be a memory bus, a peripheral bus or a local bus, and may be compatible with any of a variety of bus protocols, including PCI, VESA, Microchannel, ISA, and EISA. The computer also may include a hard drive, a floppy drive, and CD ROM drive that are connected to the system bus by respective interfaces. The hard drive, floppy drive, and CD ROM drive contain respective computer-readable media disks that provide non-volatile or persistent storage for data, data structures and computer-executable instructions. Other computer-readable storage devices (e.g., magnetic tape drives, flash memory devices, and digital video disks) also may be used with the computer. A user may interact (e.g., enter commands or data) with the computer using a keyboard and a mouse. Other input devices (e.g., a microphone, joystick, or touch pad) also may be provided. Information may be displayed to the user on a monitor. The computer also may include peripheral output devices, such as speakers and a printer. In addition, one or more remote computers may be connected to the computer over a local area network (LAN) or a wide area network (WAN) (e.g., the Internet).

III. Graphical User Interface Overview

Referring to FIGS. 3-7, graphical user interface 42 facilitates a user's interaction with procurement risk management system 40 by providing an efficient interface through which a user may specify various procurement inputs and providing a clean and uncluttered interface for displaying reports for evaluating risk in a specified sourcing portfolio along multiple output metric dimensions.

Figure 3:
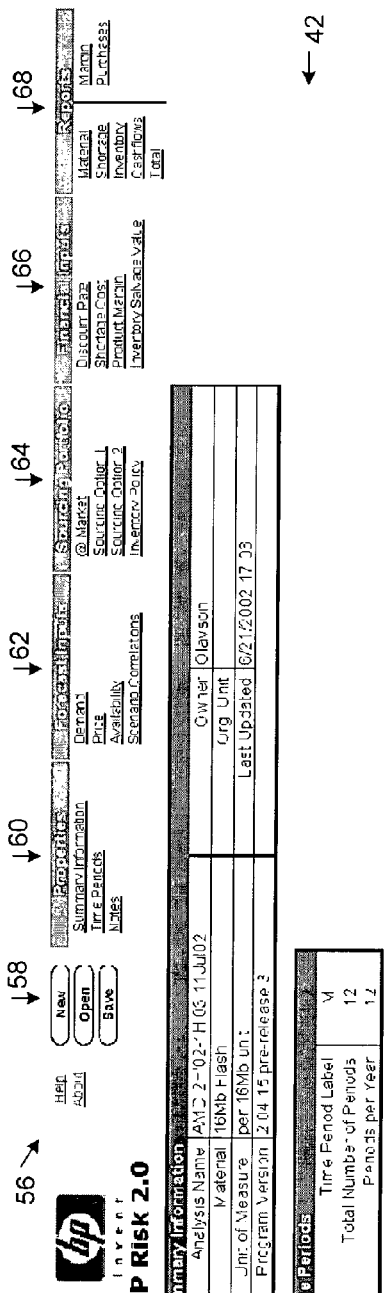
FIG. 3 is a graphical user interface through which a user may interact with the procurement risk management system of FIG. 2 and displaying summary information, time periods, and notes relating to a procurement risk management project.

Referring initially to FIG. 3, a user may control graphical user interface 42 through a control panel 56, which includes a set 58 of file control buttons, a set 60 of file Properties buttons, a set 62 of Forecast Input buttons, a set 64 of Sourcing Portfolio buttons, a set 66 of Financial Input buttons, and a set 68 of Report buttons. A user may create a new procurement risk management project by selecting the New button. Alternatively, a user may open an existing procurement risk management project by selecting the Open button. A user may save a currently open procurement risk management project by selecting the Save button.

In response to a selection of the Properties button, graphical user interface 42 displays a Summary Information window, a Time Periods window, and a Notes window. A user may selectively activate individual property windows by selecting one or more of the buttons located under the Properties button. The Summary Information window contains information relating to the current procurement risk management project and information relating to the current version of the procurement risk management system 40. The Time Periods window contains information relating to the time periods within the planning horizon of the current procurement risk management project. The Notes window contains user notes relating to the current procurement risk management project.

Figure 4:
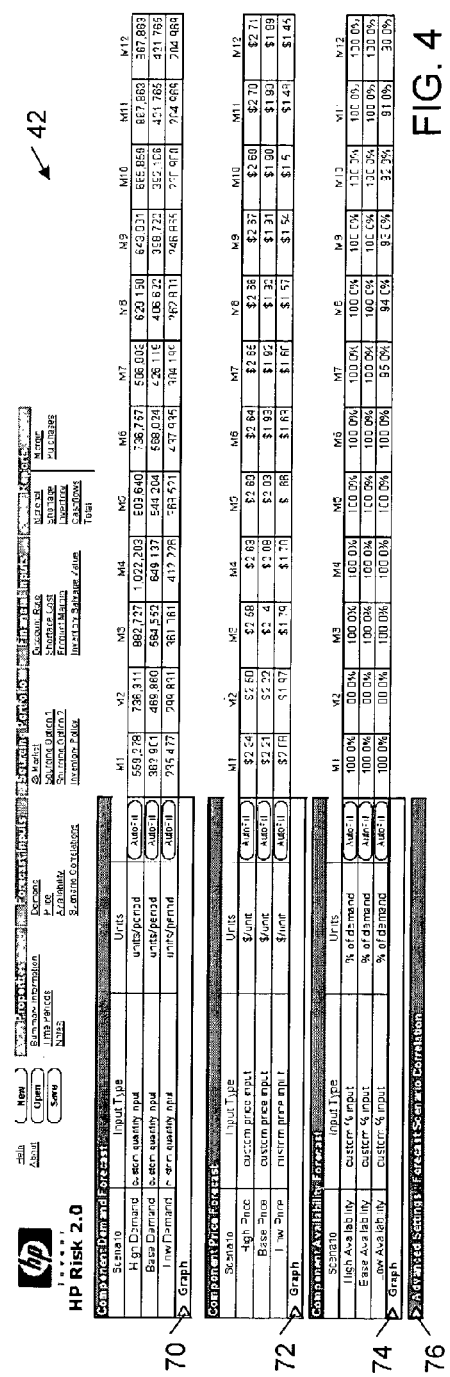
FIG. 4 is the graphical user interface of FIG. 3 presenting forecast inputs for a procurement risk management project.

Referring to FIG. 4, in response to a selection of the Forecast Inputs button, graphical user interface 42 displays a Component Demand Forecast window, a Component Price Forecast window, a Component Availability Forecast window, and an Advanced Settings: Forecast Scenario Correlation window. A user may selectively activate individual forecast input windows by selecting one or more of the buttons located under the Forecast Inputs button. The Component Demand Forecast window contains information relating to high, base and low demand forecast scenarios over time. The Component Price Forecast window contains information relating to high, base and low price forecast scenarios over time. The Component Availability Forecast window contains information relating to high, base and low availability forecast scenarios over time. Each of the Component Demand Forecast window, Component Price Forecast window, and Component Availability Forecast window includes a respective Graph button 70, 72, 74 that a user may select to display a graph of the tabular data contained in the corresponding window. The Advanced Settings: Forecast Scenario Correlation window allows a user to specify correlations between forecast scenarios. This window initially is collapsed because only advanced users are likely to specify scenario correlations. A user may open the Advanced Settings: Forecast Scenario Correlation window by selecting an open window button 76.

Referring to FIG. 5, in response to a selection of the Sourcing Portfolio button, graphical user interface 42 displays a Default: @Market window, a Sourcing Option 1 window, a Sourcing Option 2 window, and an Advanced Settings: Inventory Carrying Policy window. A user may selectively activate individual sourcing portfolio windows by selecting one or more of the buttons located under the Sourcing Portfolio button. The Default: @Market window allows a user to view the component price and availability forecasts for each scenario over time. This window initially is collapsed because it contains information that is less likely to be needed by a user when entering sourcing portfolio data into the system. A user may open the Default: @Market window by selecting an open window button 78. The Sourcing Option 1 and Sourcing Option 2 windows contain information relating to respective sourcing contracts, including summary information, contract terms, and notes. The Advanced Settings: Inventory Carrying Policy window allows a user to specify the terms of an inventory carrying policy. This window initially is collapsed because only advanced users are likely to specify an inventory carrying policy. A user may open the Advanced Settings: Inventory Carrying Policy window by selecting an open window button 80.

Figure 6:
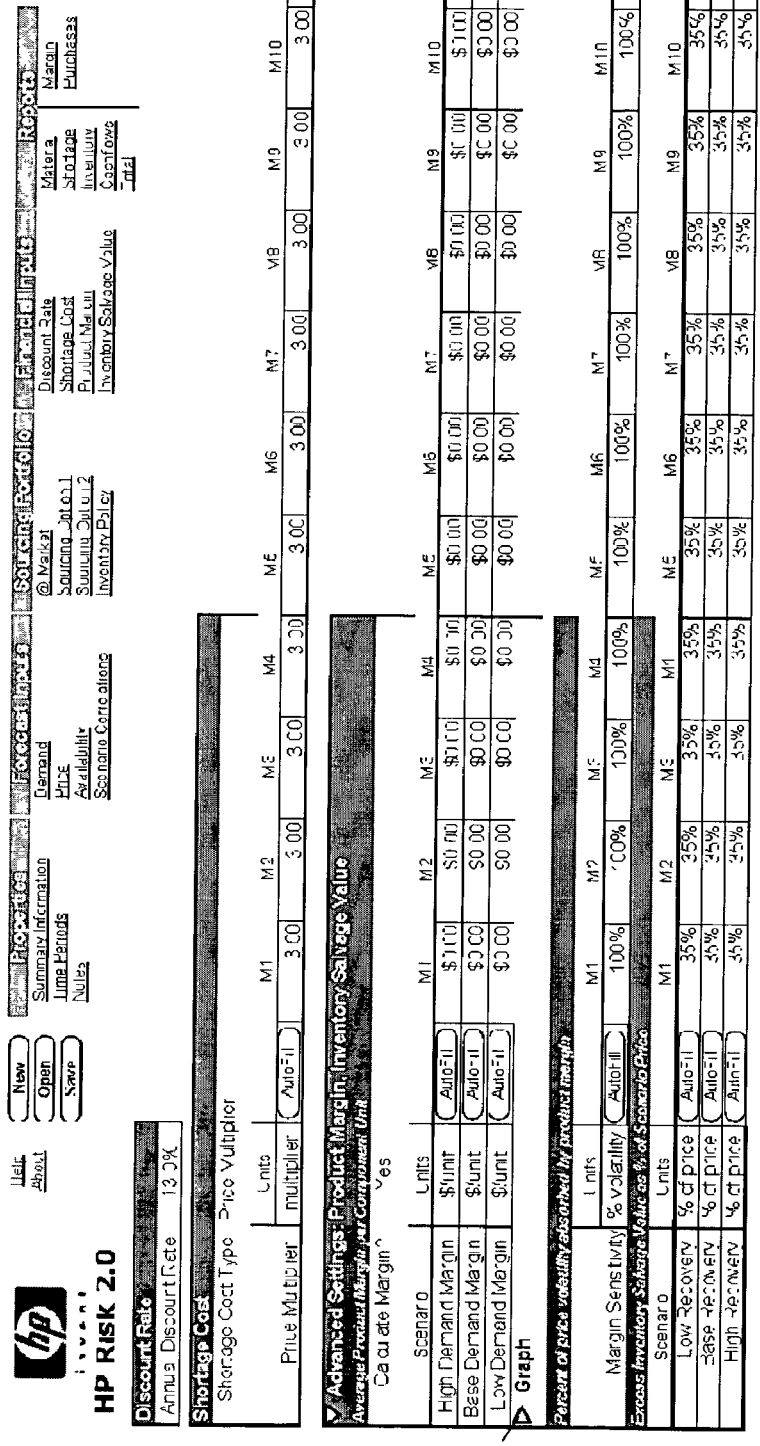
FIG. 6 is the graphical user interface of FIG. 3 presenting financial inputs for a procurement risk management project.

Referring to FIG. 6, in response to a selection of the Financial Inputs button, graphical user interface 42 displays a Discount Rate window, a Shortage Cost window, and an Advanced Settings: Product Margin, Inventory Salvage Value window. A user may selectively activate individual financial input windows by selecting one or more of the buttons located under the Financial Inputs button. The Discount Rate window allows a user to specify the discount rate. The Shortage Cost window allows a user to specify a shortage cost type and shortage cost parameters over the planning horizon. The Advanced Settings: Product Margin, Inventory Salvage Value window allows a user to specify average product margin per component unit for each scenario over time, the percent of price volatility absorbed by product margin over time, and the excess inventory salvage value as a percentage of scenarios price for each scenario over time. The Advanced Settings: Product Margin, Inventory Salvage Value window includes a Graph button 82 that a user may select to display a graph of the product margin information.

Referring to FIG. 7, in response to a selection of the Reports button, graphical user interface 42 displays a Sourcing Costs window and an Advanced Reports window. The Sourcing Costs window displays net present value (NPV) data for each scenario for the following output metrics: material cost, shortage cost, inventory cost, other cash flows, and total cost. In addition, the chance that the specified sourcing portfolio will have a higher cost than a buy-at-market sourcing strategy also is presented in the Total Cost section. The Sourcing Cost information is presented for the specified sourcing portfolio, a buy-at-market sourcing portfolio. In addition, the relative change from going from the buy-at-market sourcing portfolio to the specified sourcing portfolio is presented for each metric and each scenario. Each of the material cost, shortage cost, inventory cost, other cash flows, and total cost output metrics includes an associated Details button 84, 86, 88, 90, 92 that a user may select to open a menu of additional reports that may be presented relating to the associated output metric. The Advanced Reports window displays margin NPV data for each scenario and sourcing portfolio, the relative margin improvement between the specified sourcing portfolio and a buy-at-market sourcing portfolio, and the chance that the specified sourcing portfolio will yield a lower margin than the buy-at-market sourcing strategy. In addition, the Advanced Reports window displays a Purchase Quantities button that allows a user to display a menu of additional reports that may be presented relating to resource quantities purchased over time in an optimal resource sourcing mix. A user may selectively activate individual report windows by selecting one or more of the buttons located under the Reports button.

IV. Specifying Inputs

Referring to FIGS. 8-28 and initially to FIGS. 8-12, in one embodiment, procurement risk management system 40 may compute an optimal resource sourcing mix and one or more metrics for evaluating the computed resource sourcing mix as follows.

A. Specifying Forecast Inputs

Initially, procurement risk management system 40 receives forecast scenarios for resource demand, resource price, and resource availability (step 100). As shown illustratively in FIG. 9, uncertainty is modeled by procurement risk management system 40 using a scenario-based analysis. Procurement risk management system 40 represents forecast scenarios with a tree structure 102. In the illustrated embodiment, three demand scenarios (high, base, and low) and three price scenarios (high, base, and low) are represented. Each scenario is associated with a respective probability and a respective forecast of values over a planning horizon (e.g., Q1, Q2, Q3, and Q4). A user may enter values for each period of the planning horizon for each of the demand, price and availability scenarios through the Component Demand Forecast window (FIG. 10), the Component Price Forecast window (FIG. 11), and the Component Availability window (FIG. 12), respectively.

Figure 10:
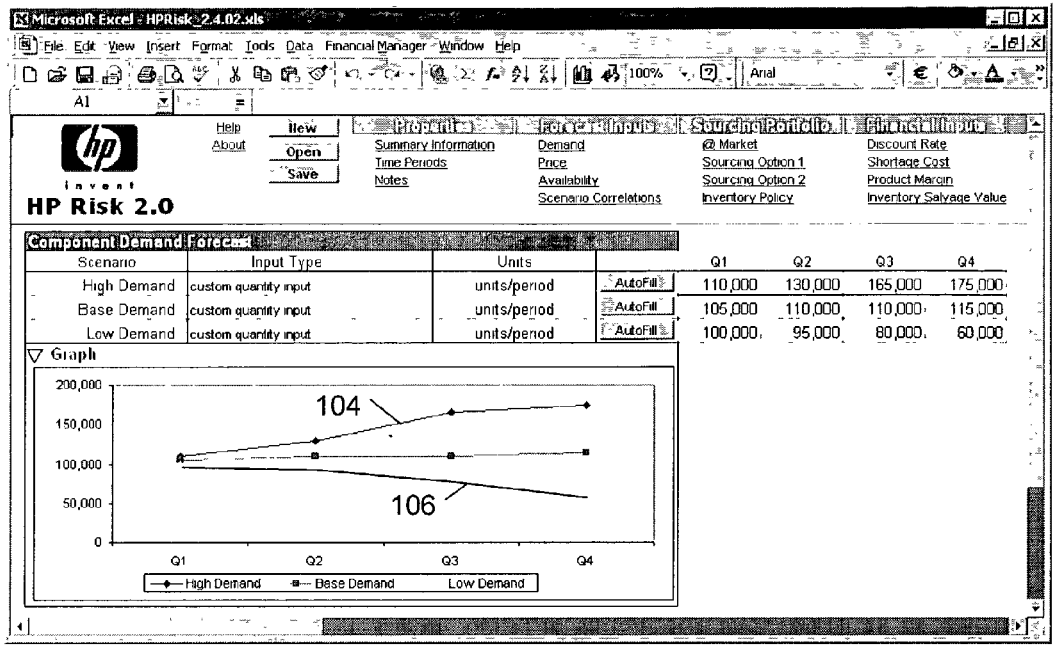
FIG. 10 is a graphical user interface presenting multiple resource demand forecast scenarios over a planning horizon.

As shown in FIG. 10, in the illustrated example, demand forecast uncertainty is assumed to grow with time. Demand uncertainty may be estimated based on historical forecast accuracy data using standard techniques. The high demand scenario 104 assumes that firm 14 lands a major vending contract for 50,000 units per quarter, and the low demand scenario 106 assumes that firm 14 loses 35% of the market to competitors.

Figure 11:
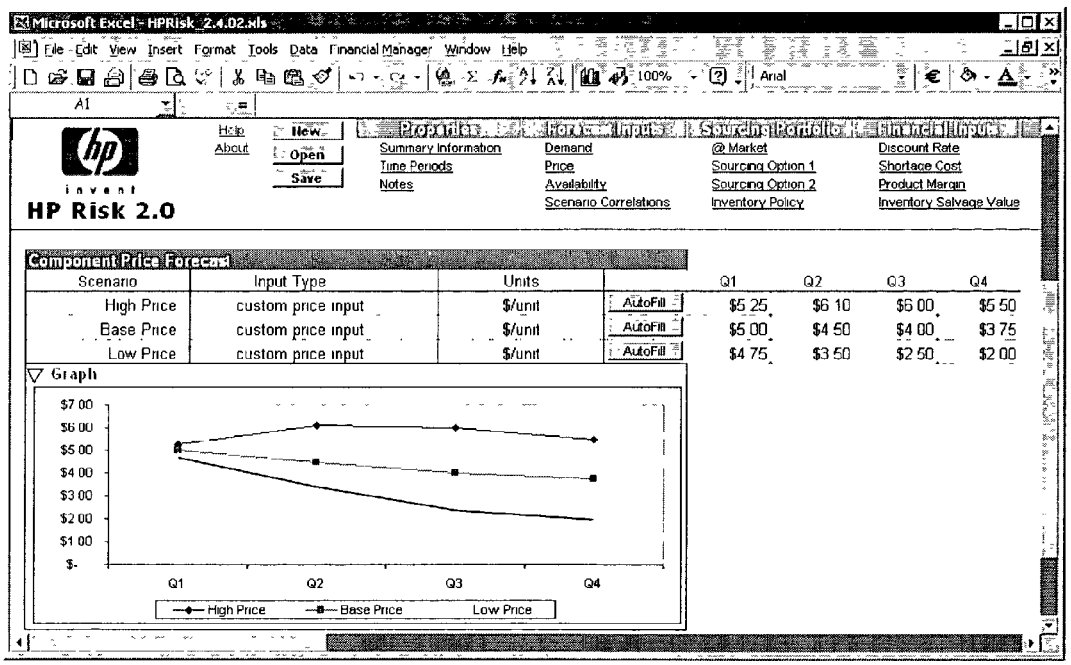
FIG. 11 is a graphical user interface presenting multiple resource price forecast scenarios over a planning horizon.

As shown in FIG. 11, in the illustrated example, price forecast uncertainty is assumed to grow with time. In general, prices are expected to decline over the planning horizon, although there is a possibility of a price increase. In this embodiment, the short term price is the price firm 14 pays if it buys at market from periodically renegotiated short term unstructured contracts. This is assumed to be the default alternative to longer term contracts (or inventory buys).

Figures 12, 13:
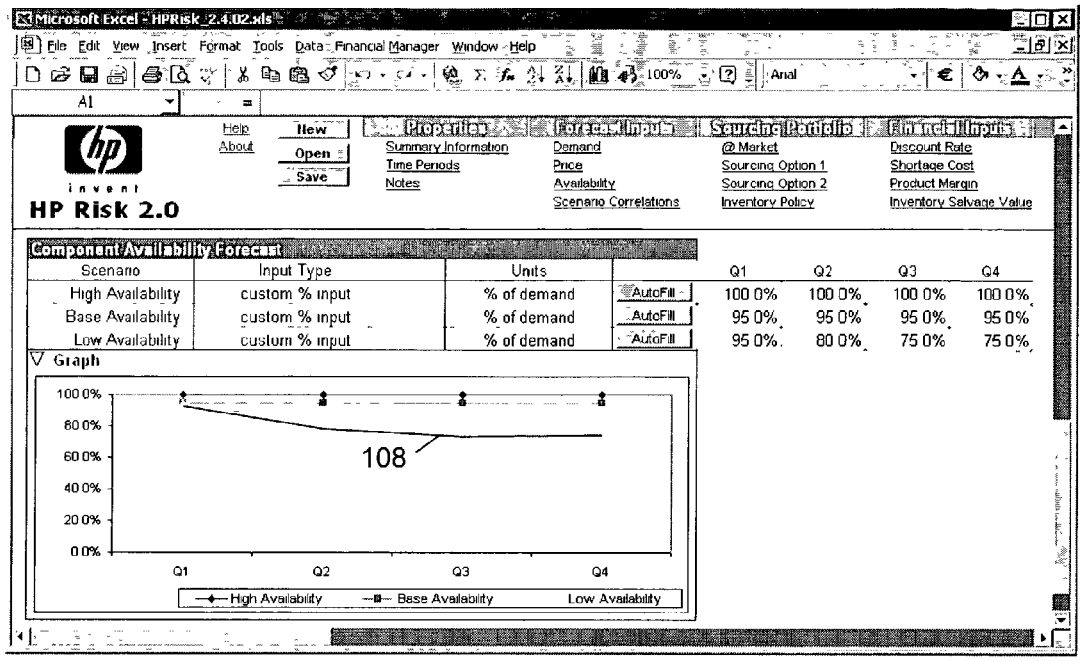
FIG. 12 is a graphical user interface presenting multiple resource availability forecast scenarios over a planning horizon.
FIG. 13 is a graphical user interface through which a user may specify multiple forecast scenarios for each of resource demand, resource price, and resource availability.

As shown in FIG. 12, in the illustrated example, availability forecast uncertainty is assumed to grow with time. Availability is the fraction of the demand that firm 14 would actually get from its suppliers at sufficient lead time to avoid shortages. This definition assumes that buying at market through periodically renegotiated short term unstructured contracts. In the low availability scenario 108, global supply is forecasted to meet 75% of global demand at the prevailing prices.

Referring to FIG. 13, in one embodiment, simplified graphical user interfaces 110, 112, 114 may present to a user simple menus 116, 118, 120 of options for creating low and high forecast scenarios from expected (or "base") forecasts. The base forecasts may be obtained using any one of a wide variety of known forecasting techniques. Each input menu 116, 118, 120 presents users with easy options for inputting forecast scenarios. For example, in some cases price uncertainty may not be important to the analysis. In these cases, a user conveniently may select from a menu the way in which the low and high scenarios are to be generated, instead of having to manually estimate and input all values for the low and high scenarios. The menu choices also provide some useful benchmarks for users when developing their own custom scenarios. For example, procurement risk management system 40 may suggest what a "high volatility" scenario would look like and may have some context for what kind of commodities or situations in which the "high volatility" would apply. With this information, users may be better guided and better grounded in developing their custom forecast inputs. In addition to offering simple options for generating high and low scenarios, the process of inputting the information is simplified. For example, if a particular planning horizon has twenty-four periods, it would be tedious for a user to have to enter manual inputs for each period. In the illustrated embodiment, a user may create period-by-period forecasts by entering only a few key inflection points and having the procurement risk management system 40 fill in the blanks. The specific menu options and mechanics are described below.

AutoFill Function

The AutoFill function allows users to input one or more values in the forecast inputs, and the procurement risk management system 40 fills in the blanks through linear interpolation. In another embodiment, a user may specify an initial condition and a growth rate, rather than using linear interpolation. The fill-in-the-blanks approach of the illustrated embodiment may be used for the base scenario forecasts, and for the high and low scenarios forecasts for price and demand when the input type is "custom" or "custom %". The logic for the fill-in-the-blanks is as follows. The same logic would apply to any row of inputs, regardless of units.

1. If all cells are blank or zero, generate an error message explaining the function of the AutoFill feature.
2. If only one cell in the row has a positive value, assign that value to all other cells in the row. (Constant forecast).
3. If there are two or more cells with non-zero values, linearly interpolate between points.
   a. For blank cells between two non-zero points: if current blank cell is at period j and is between cells at periods i and k, such that i<j<k, then:

$$\text{value}(j) = \text{value}(i) + \left(\frac{j-i}{k-j}\right)(\text{value}(k) - \text{value}(i))$$

b. For a blank cell at period i preceding the first two non-zero cells at periods j and k:

$$\text{value}(i) = \text{value}(j) - \left(\frac{j-i}{k-j}\right)(\text{value}(k) - \text{value}(j))$$

c. For a blank cell at period k following the last two non-zero cells at periods i and j:

$$\text{value}(k) = \text{value}(j) + \left(\frac{k-j}{j-i}\right)(\text{value}(j) - \text{value}(i))$$

Forecast Menus

The demand forecast menus have the following input types:

| Choice under "input type" menu | Corresponding units |
| --- | --- |
| custom quantity input | units/period |
| custom % input | % of base |
| template 1; stable demand (fairly) | % of base |
| template 2: product line demand | % of base |
| template 3: individual product demand | % of base |
| template 4: new product category (highly) | % of base |

The price forecast menus have the following input types:

| Choice under "input type" menu | Corresponding units |
| --- | --- |
| custom price input | $/unit |
| custom % input | % of base price |
| template 1: fairly predictable | % of base price |
| template 2: somewhat uncertain | % of base price |
| template 3; highly uncertain | % of base price |

The % input is a custom input that is a more intuitive or familiar way of thinking about the input. It is also in a generic form that may be leveraged across different products or cases, regardless of base demand level. The other three types of inputs are standard templates (in % terms) that the user may apply. The procurement risk management system 40 provides the formulas or data for these templates in the model, based on demand or price scenario templates, which are described below. The procurement risk management system 40 also may include comments about what types of products or conditions are consistent with high, medium, and low volatility.

The procurement risk management system 40 also provides the user with the flexibility to toggle back and forth between the different input types. Toggling the input type back to "custom" or "custom %" preserves the current values, but a user may change these values. For example, a user might start off with one of the standard template choices (e.g., "medium variance"), then tweak some of the values after selecting "custom" or "custom %". If "custom quantity" or "custom price" is selected, the procurement risk management system 40 would translate the % terms into absolute terms. Note that the graphs always display the forecasts in absolute unit terms.

Demand Forecast Templates

Figure 14:
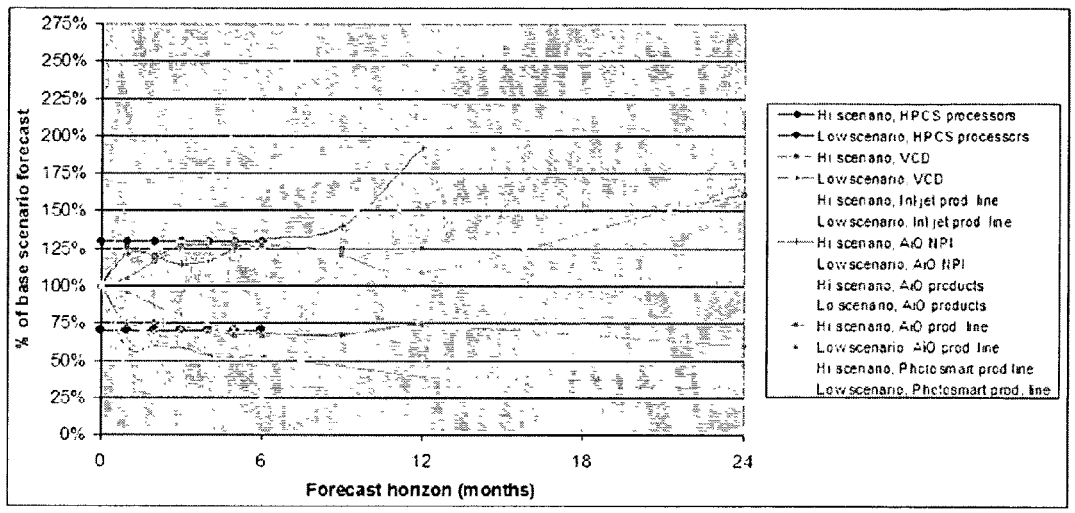
FIG. 14 is a window displaying graphs of demand forecast accuracy plotted as a function of forecast horizon.

Referring to FIGS. 14-17, procurement risk management system 40 may present to the user one or more forecast templates to assist the user in creating scenario ranges for demand and price forecast inputs. The following forecast template examples are fairly diverse, giving a broad sampling of different kinds of demand forecast scenarios. Demand templates were derived from actual procurement data, which is shown in FIG. 14. These demand forecast templates may be categorized into four types:

Stable Demand

This type of demand forecast is not as sensitive to the time horizon. Each period's demand is uncertain, but the uncertainty does not grow much with time. In probabilistic terms, this is like a stationary demand process, where demand in each period is described by the same random variable, and there is no correlation over time. A good example of this is the demand requirements for replacement parts. At least in the short-term (scenario forecasts were only available up to six months), the forecast uncertainty does not seem to be affected by the forecast horizon. A likely explanation is that in the support environment, the component demand is relatively predictable, and uncertainty is not compounded over time by uncertain product growth rates. It is noted that the variance of a stationary process is constant in any period, and the variance of a non-stationary process grows with the forecast horizon.

Product Line Demand

In this category demand from individual products is uncertain, but demand pooling across products reduces the uncertainty. For example, the forecast for a product line may aggregate a number of different products together. Since some of the variability offsets, the product line demand uncertainty is less than the uncertainty of any of the individual products.

Individual Product Demand

Demand in this segment is more uncertain, particularly in the longer term forecasts. The AiO (All-in-One) examples were based on data from 3-5 different products (without demand aggregation). The "NPI", or new product introduction, scenarios included only forecasts for the first six months after manufacturing release. The "product" forecasts included all months in the product's lifecycle. It does not appear that conditioning on the NPI months makes much difference in the uncertainty ranges. Therefore, we do not offer a template based on lifecycle stage.

New Product Category

This category has the highest level of uncertainty, since the product is unproven in the marketplace. We only have one example in this category, so it's difficult to generalize much here. However, this example is a good proxy for a "highly uncertain" category.

Figure 15:
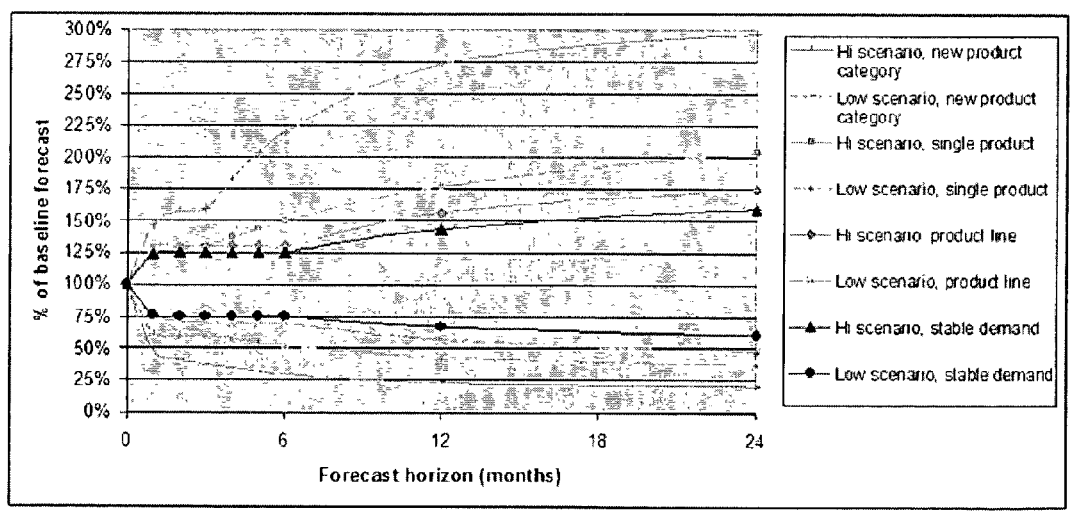
FIG. 15 is a window displaying graphs of model templates for high and low demand forecast scenarios.

Referring to FIG. 15, the above examples were used to define the four demand uncertainty templates quantitatively. A mathematical expression for high and low scenarios is developed using several parameters that vary for each template. The mathematical expression for each of the curves is the same, and four parameters are unique to each template:

$$y(m) = \begin{cases} b - (b-1)\exp[-3m/k_1] & \text{if } m \le t \\ b - (b-1)\exp[-3m/k_1] + d - d\exp[-3(m-t)/k_2] & \text{if } m > t \end{cases}$$

where y is the high or low scenario value (% of base demand) in month m; b is the upper or lower "boundary value" parameter in the first phase; k, is the time constant parameter (number of months before value reaches 95% of boundary value) in the first phase; t is the time at which the second phase kicks in; d is the incremental shift from the first phase to the second phase, and $k_2$ is the time constant parameter for the second phase to stabilize. The values used for the templates of FIG. 15 are:

| | time constant 1 (k1) | boundary value (b) | transition time (t) | time constant 2 (k2) | delta (d) |
|---|---|---|---|---|---|
| Hi scenario, product line | 2 | 130% | 6 | 24 | 50% |
| Low scenario, product line | 2 | 70% | 6 | 24 | −25% |
| Hi scenario, single product | 1 | 130% | 3 | 36 | 90% |
| Low scenario, single product | 1 | 60% | 3 | 24 | −25% |
| Hi scenario, new product category | 2 | 160% | 3 | 16 | 140% |
| Low scenario, new product category | 1 | 45% | 1 | 16 | −25% |
| Hi scenario, stable demand | 1 | 125% | 9 | 12 | 35% |
| Low scenario, stable demand | 1 | 75% | 9 | 12 | −15% |

If a different period length were in use other than months, we would still use m for the current period number, but use different values for the time dependent parameters k1, t, and k2. The transformation would be: time constant k'=k*(number of model periods per year/12). For example, if period length were quarters, and we wanted to calculate y for the second quarter, we would use m=2 and a value for k that is 4/12=1/3 the value in the parameter table above. I do not recommend filling in template values for horizons greater than 24 months.

Price Forecast Templates

Figure 16:
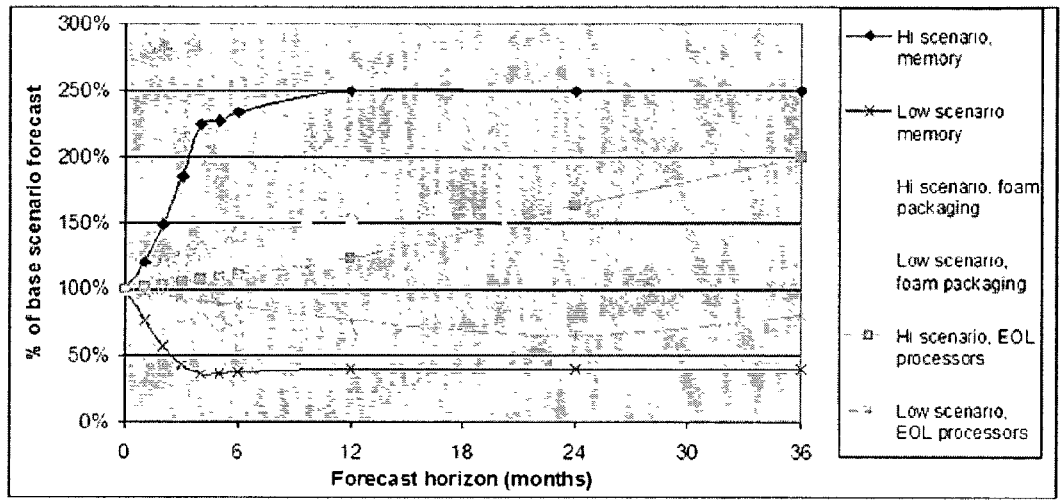
FIG. 16 is a window displaying graphs of exemplary high and low price forecast scenarios.
Figure 17:
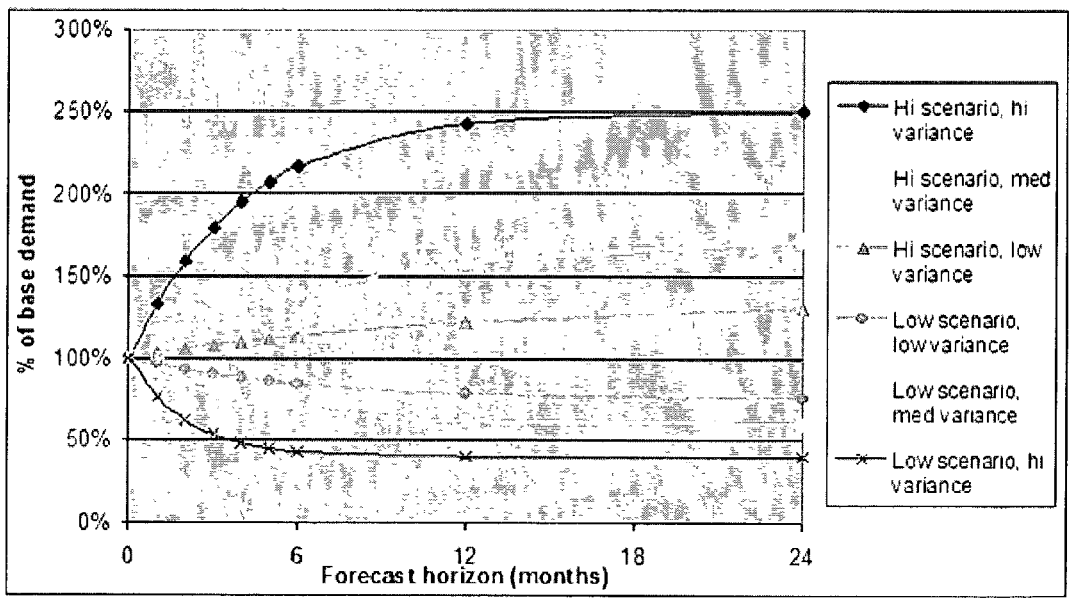
FIG. 17 is a window displaying graphs of model templates for high and low price forecast scenarios.

As shown in FIG. 16, there are several price scenario forecast datasets that are roughly representative of high, medium, and low variance price processes:

Fairly Predictable Price

In this case, price follows a fairly predictable trend with little uncertainty. This is the case for microprocessors, for example. Though prices are still dynamic, they follow a very predictable downward trend. Prices are more uncertain near the tail end of the EOL (End Of Life) period.

Somewhat Uncertain Price

In this case there is some uncertainty around price, but the market does not move in dramatic cycles dependent on a small supply base with long lead times for new capacity. From actual data some assumptions were made about low and high scenarios. In particular it was assumed that the base forecast would have been roughly constant, and the downward price trend in the data was reflective of a low scenario in the long-term, and the most dramatic short-term price drops were reflective of a low scenario in the short-term. It was then assumed that the proportional changes in the high scenario would be a mirror image of the low scenario case.

Highly Uncertain Price

The "high variance" type would represent markets with volatile demand, concentrated supply base, and long-lead times for capacity additions. DRAM is an example of this type of market. The LCD market is similar. We have a detailed model of DRAM prices that we can use as a benchmark for "high variance" scenarios. Scenario values will depend on short and long term trends. Some "neutral" values, in which there would be neither short-term nor long-term trend effects present, were picked. One may think of this as an "average" variance on the high and low sides for DRAM.

B. Specifying Scenario Correlations

Figure 8:
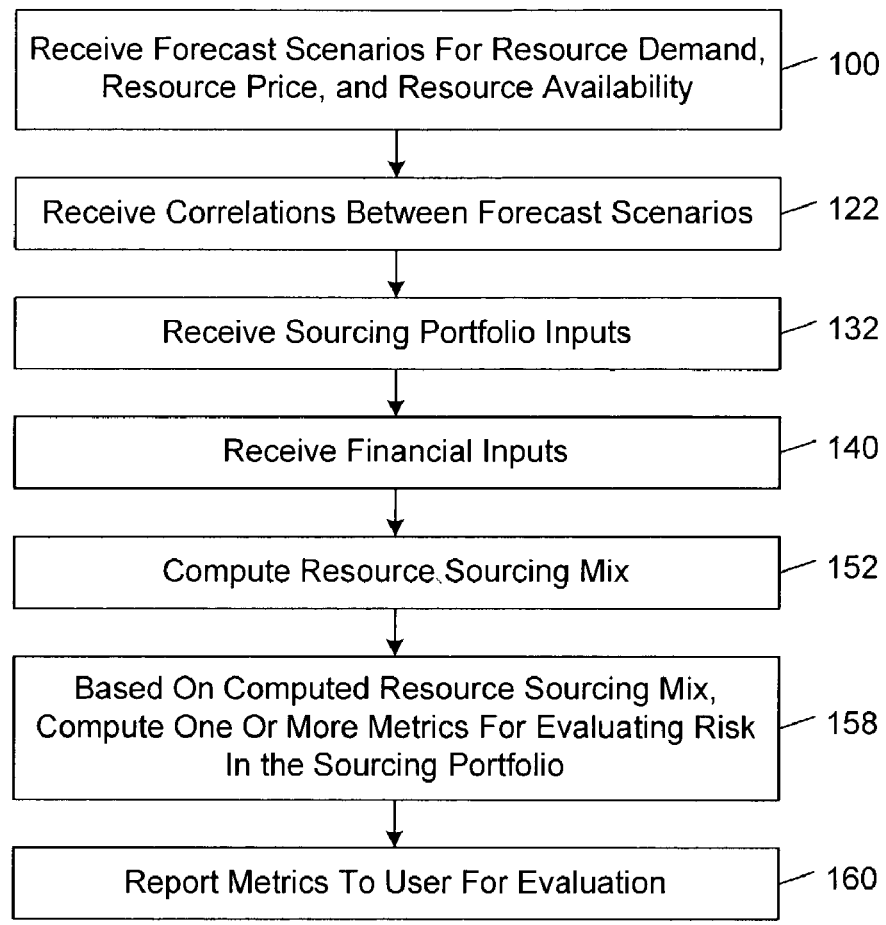
FIG. 8 is a flow diagram of a method of managing procurement risk.
Figure 9:
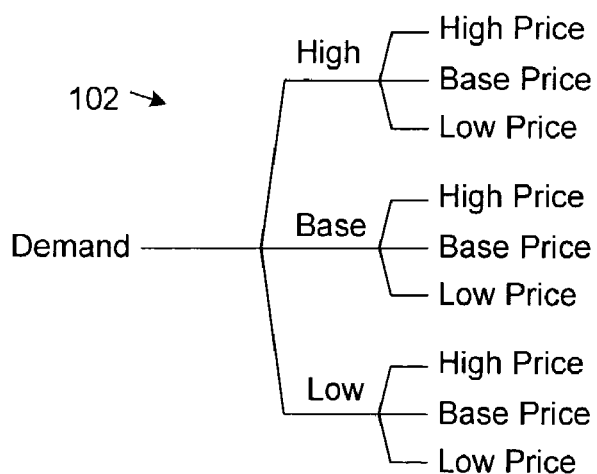
FIG. 9 is a diagrammatic view of a canonical scenario tree.
Figure 18:
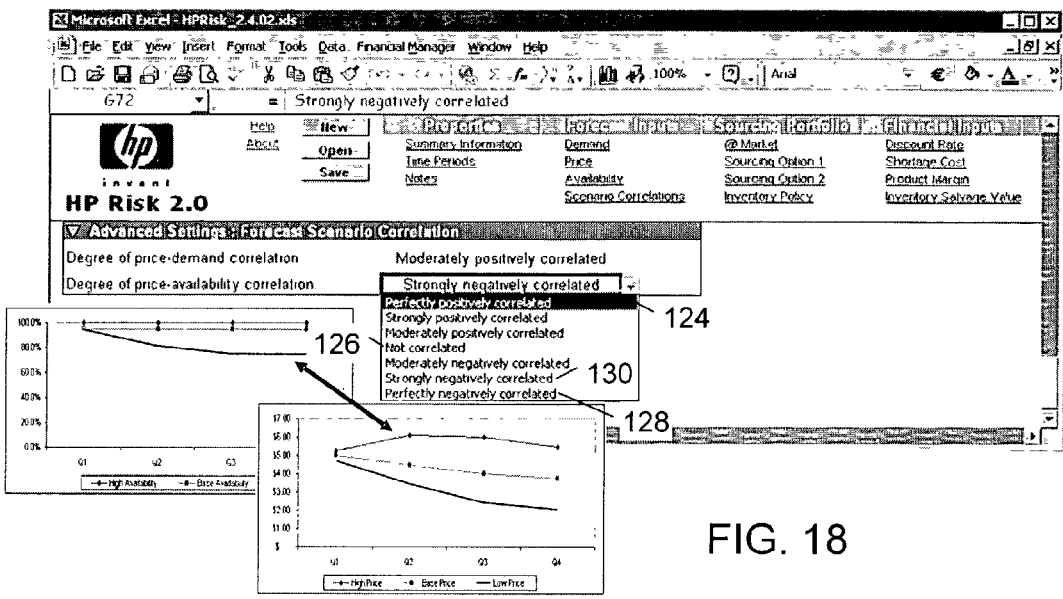
FIG. 18 is a graphical user interface through which a user may specify degrees of price-demand correlation and price-availability correlation.

Referring back to FIG. 8 and to FIG. 18, in some embodiments, a user may specify correlations between forecast scenarios to the procurement risk management system 40 (step 122; FIG. 8). In the illustrated embodiment, a user may select among correlations that range from perfect positive 124, to no correlation 126, to perfect negative 128. For example, a strongly negative correlation 130 means that when price follows the high scenario, availability is very likely to follow the low scenario. In this example, if price tends to be high when availability is low, profits are more likely to take a simultaneous hit from both higher material costs and shortage costs.

Figure 19A:
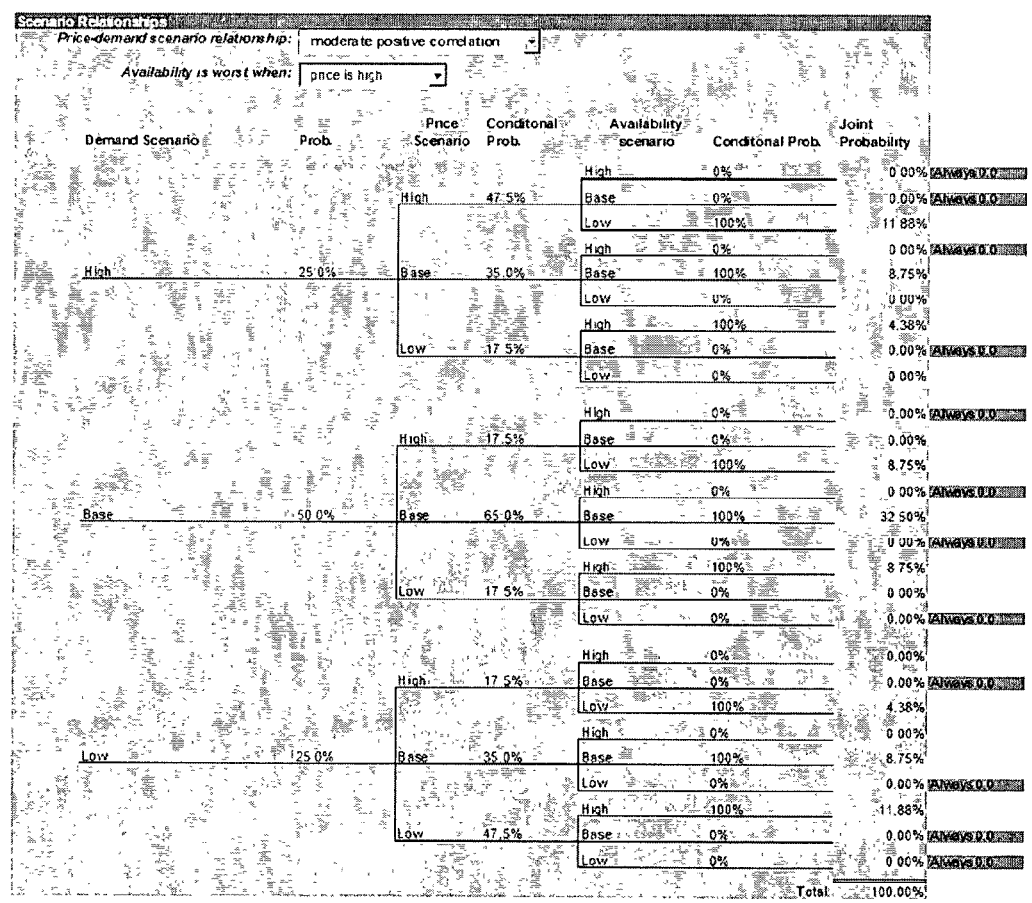
FIG. 19A is a graphical user interface through which a user may specify a degree of price-availability correlation and visualize the impact of such correlation as a scenario tree.
Figures 19B, 20A:
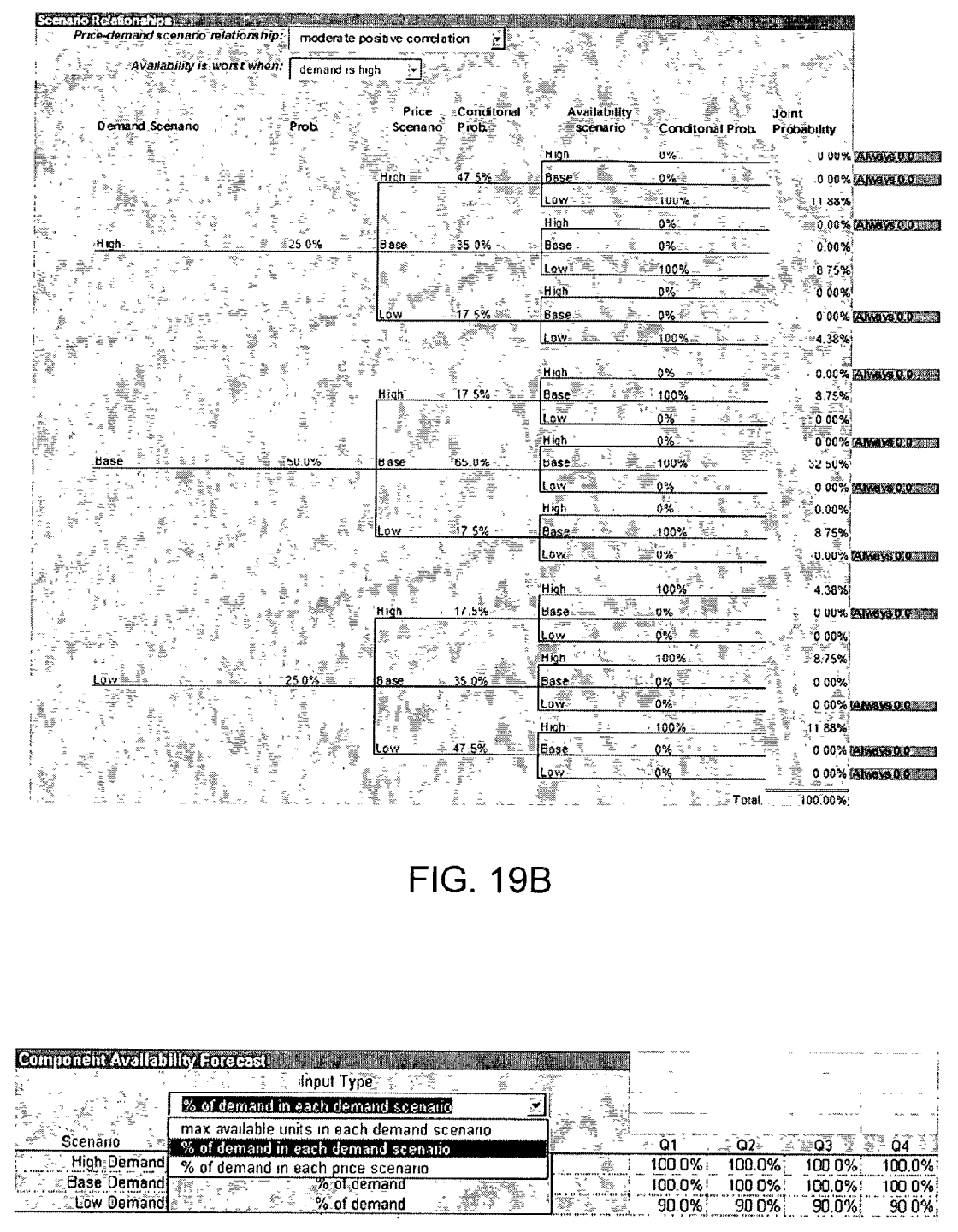

As shown in FIGS. 19A and 19B, in some embodiments, procurement risk management system 40 does not allow partial availability correlations and, instead, allows availability to be perfectly negatively correlated with either price or demand. In these embodiments, procurement risk management system 40 only solves for scenarios with non-zero probabilities. Among the advantages of this approach is that it provides flexibility where it typically is useful (i.e., price-demand partial correlations, linking availability to either price or demand), but not where it typically is not useful (i.e., partial correlations for availability). In these embodiments, the demand-price correlation menu remains the same as the embodiment illustrated in FIG. 18, but the price-availability correlations menu is replaced with one that allowed linking availability to either price (FIG. 19A) or demand (FIG. 19B). In the illustrated embodiments, there are seven possible choices in the price-demand correlation menu and two possible choices in the availability menu, so there are a total of fourteen sets of scenario probabilities. Of the twenty-seven original scenarios, there are twelve in the new framework that always have zero probability. Of the remaining fifteen, only nine have non-zero probability at any one time. So calculations need only be performed on nine scenarios under a given selection on the availability correlation menu.

Figures 20B, 21A:
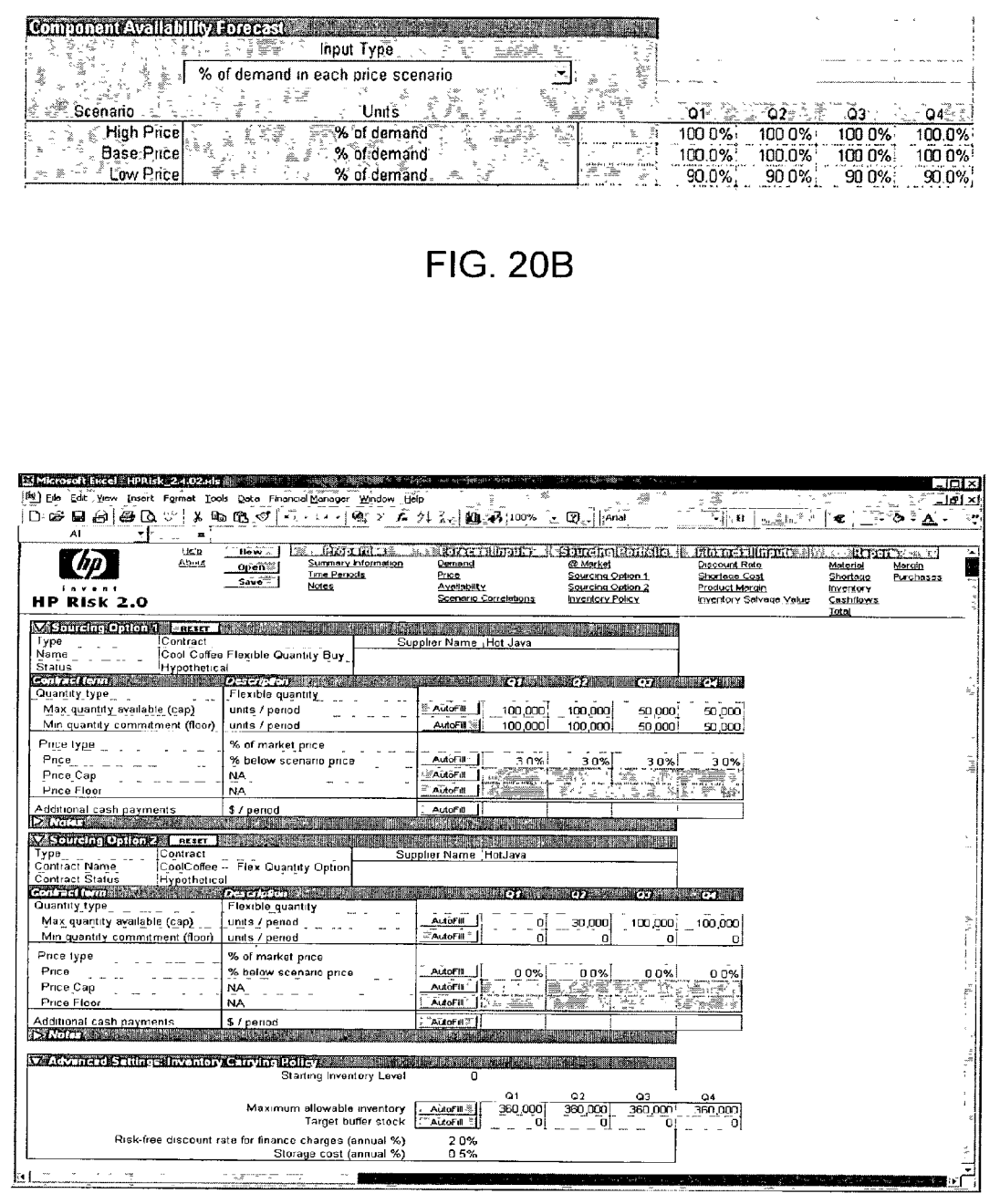

Referring to FIGS. 20A and 20B, in some embodiments, a user may specify availability as a percentage of demand in either each demand scenario (FIG. 20A) or each price scenario (FIG. 20B). In these embodiments, the availability inputs are presented to the user in a way that makes correlations more intuitive and allows more user flexibility in how to input availability. This user interface is dynamic in the sense that scenario labels refer to either price or demand scenarios. This has the additional advantage of not requiring users to think about "low", "base", and "high" availability scenarios because the linkage to price or availability scenarios is right there in front of them.

In some embodiments, a user may specify availability in absolute quantity terms, rather than percentage terms.

In other embodiments, a user also may specify a "max available units" input. Essentially, this input implies that the amount available from the market is independent of other contract options. In embodiments that do not include this input parameter, a user may buy less from the market the more resources that are sourced from contract options. For example, if availability is 90%, and demand is 100 units, then a user could buy ninety units from market if there were no other options. However, if there were contracts supplying fifty units, then we could only buy 50*0.90=45 units from the market. This may be a reasonable formulation when dealing with the same supplier(s) in the contract and market sourcing options. However, there may be other cases in which the portfolio sourcing options and market option are from entirely different sources, and should be treated independently. For example, the portfolio sourcing option may be a lifetime buy of inventory, and the market sourcing option may represent a spot market broker. The amount that can be bought from the broker should not be impacted by the amount of inventory previously was purchased from the OEM (Original Equipment Manufacturer). Without the "max available units" input, amount that can be bought from the broker would be impacted. In these embodiments, all formulas containing the availability variable are conditional on the availability type selected.

C. Specifying Sourcing Portfolio

Referring back to FIG. 8 and to FIG. 21A, in addition to a short term "buy-at-market" sourcing option, a user may specify a the terms of one or more sourcing contracts in a contract portfolio through respective sourcing option windows 86, 88 (step 132; FIG. 8). In general, a user may specify short-term contract, long-term contracts, inventory buys, special deals, and other sourcing commitments and these sourcing options can be valued by specifying a combination of individual quantity and pricing terms over time for each sourcing option. Among the quantity terms that can be specified are: fixed quantity, minimum and/or maximum quantity, and fixed and flexible percentage of total available market (TAM). Among the pricing terms that can be specified are: market-based with specified discounts, fixed price, price caps and floors, and upfront payment and option premium. In the illustrated example, Sourcing Option 1 corresponds to a fixed quantity commitment over the planning horizon with a 3% price discount term. Sourcing Option 2 corresponds to a flexible quantity (guaranteed availability) contract.

As shown in FIG. 21B, a user also may specify an inventory carrying policy in an Inventory Inputs window 134. In this approach, a user may specify a target inventory buffer level that the procurement risk management system 40 will try to maintain when computing an optimal resource sourcing mix. The procurement risk management system 40 tries to maintain inventory close to the "target buffer stock" level. It draws on this inventory only to prevent shortages. It buys and holds inventory only after a shortage has occurred, and availability is good enough to replenish the inventory stock back towards the buffer level. If the initial inventory level is greater than the target level, the procurement risk management system 40 gives preference to depleting inventory over buying from market. If the inventory level is ever above the maximum allowed inventory level (due to contract commitments exceeding demand), then the procurement risk management system 40 sells the excess back on the market at a value specified in the "Excess Inventory Salvage Value" inputs. For example, in electricity we would want to set the maximum value to zero, since the electricity cannot be stored. Initial inventory level is a user input, and the difference in market value of inventory from the last period to the first period is added to the total cost and margin NPVs (Net Present Values). Final period inventory is not sold off as excess; only inventory above the maximum allowable level is sold as excess. If the user wanted to sell off all inventory at the end of the last period, then a user would specify that the maximum allowable inventory level in the last period is zero.

In some embodiments, procurement risk management system 40 may be configured to draw down the inventory as if it were a contract with 100% availability at an d % discount below market price, where d % would be the drop in expected price from current period to the next, using the price scenario inputs. The logic is that if you have a competing contract that allows you to buy the component for less than you can buy at market in the next period, you should buy off that contract today and save the inventory for the next period.

Inventory Inputs window 134 preferably is moved off the main input sheet and onto an "advanced inputs" sheet. Many users will not care for inventory features, and should not be burdened with these inputs. In some implementations, the inventory inputs are set to default values, such as 100% for value recovered and 0% for the inventory buffer sock target. The account manager can highlight these inputs and suggest values if they are important to users. Among the inventory inputs that a user may specify are the following: starting inventory level; maximum allowable inventory; target buffer stock level; risk-free discount rate for finance charges (annual); and storage cost (annual). A user also may specify excess inventory salvage value as a percentage of scenario prices. In the illustrated example, it is assumed that if there is excess inventory in the last period, firm 14 can value it at 80% of the current market price in the low recovery scenario, at 90% of the current market price in the base recovery scenario, and at 100% of the current market price in the high recovery scenario.

In some embodiments, a user also may specify rebates and penalties in a separate inputs window (not shown). These inputs may be specified using "cash payments to supplier" and "penalties to supplier" inputs. Penalties and rebates can affect the optimal quantity mix among contracts in a given period. In general, rebates are path-dependent (not single period), since they depend on cumulative purchase quantity. Also, supplier penalties are uncertain (not deterministic) from a buyer's point of view. The supplier may choose to deliver on the contract quantities, or pay a penalty and not deliver on the contract quantities. Supplier penalties also are tied to "contract-specific" availability. Contract specific availability scenarios may model supplier behavior vis-à-vis market and contract prices, quality problems with supplier, etc. Rebates can come in two flavors: (a) the cumulative rebates that are path dependent, and (b) the non-path dependent periodic volume-based rebates. For example, (i) buy more than 100 units and get 5% off on the all the units bought, or (ii) for all units above 100 get a 10% discount (a "tiered" pricing term). The former may be modeled as a non-linear cost term (e.g., if quantity $\geq 100$, then p=p*0.95, else p=p), and the latter uses a tiered pricing calculation.

In one embodiment, certain simplifying assumptions are made to approximate rebates and supplier penalties. With regard to supplier penalties, Procurement risk management system 40 assumes that suppliers always deliver on contract commitments (e.g., they have no release options through penalties). This is roughly equivalent to saying that the supplier penalty is equal to the buyer's shortage cost. In a shortage situation, that makes the buyer indifferent between getting the part from the supplier or having the supplier pay the penalty. With regard to rebates, the rebate terms are translated into the contract price terms in the model based on our expected purchase quantity. For example, if the contract is at a fixed price of $100/unit, with a rebate of 5% for cumulative purchase quantities above 100K, then the contract price is modeled as $95 during those periods in which we expect the cumulative quantity to exceed 100K. If the rebates apply to per period purchase quantity, a user may make some assumptions about which periods we will qualify for the rebate. This requires some "manual" calculation, and does not consider rebates in deciding on the optimal contract exercise. However, this approach allows procurement risk management system 40 to approximate the expected benefits of the rebates, though not the scenario-based benefits.

D. Specifying Financial Inputs

Referring back to FIG. 8 and to FIG. 22A, in the illustrated embodiment, a user may input financial data into procurement risk management system 40 through a financial inputs graphical user interface 138 (step 140; FIG. 8). In this graphical user interface, a user may specify an Annual Discount Rate 142, which corresponds to the cost of capital for firm 14 (i.e., the expected average annual return on invested cash). A user also may specify the cost impact of a shortage in an Advanced Settings window 144. In the illustrated example, it is assumed that for each resource unit that firm 14 is short, firm 14 loses $5 margin in lost sales opportunities. A user also may specify shortage cost and percent of price volatility absorbed by product margin in windows 146, 148, respectively.

As shown in FIG. 22B, in some embodiments, a user may specify a shortage cost type from a list presented in a pull down menu 150. In the illustrated embodiment, the shortage cost menu on the input sheet features three choices for "shortage cost type": Lost Margin, Fixed Cost/Unit Adder, and Price Multiplier. The meanings of these interpretations of shortage are explained below.

Lost Margin

Shortage can be interpreted to mean that components are not available, and substitute parts or supply sources cannot be found. The assumption is that this results in line stops and lost sales. The cost of the shortage, then, is the margin on the product for which the sale was lost due to the component shortage. This lost margin should also account for lost follow on sales opportunities (e.g., print cartridges for lost printer sales). The product margin should be divided by the number of component units required in the product. For example, if a printer with $20 margin requires 2 chips, then the shortage cost per chip is $10.

Fixed Cost/Unit Adder

Shortage can be interpreted to be a cost added to the price specified in the forecast scenarios. The shortage might be a tangible cost, like the incremental cost of substituting another higher cost part. It may also be an intangible cost, like the cost associated with lost customer goodwill due to delayed shipments, or managerial cost associated with finding available parts. For example, in a customer support division, the fixed cost interpretation may be used to account for customer goodwill and managerial costs associated with delayed shipments, and availability was interpreted to mean "on-time" availability of components.

Price Multiplier

Shortage can be considered to have a multiplier effect on the price specified in the price scenarios. If the price scenarios are created with a particular "default" supply source in mind, then a shortage from this default source can be covered by buying from another higher priced supply source at a multiple of the scenario price. For example, the price and availability scenarios may refer to short-term, unstructured supplier contracts, and the multiplier would apply to purchases from spot market brokers. This is a plausible interpretation for purchases of memory for PCs. If parts cannot be obtained from suppliers under short-term unstructured contracts, they may be available from the spot market at a proportionally higher price. This input should be constrained to be greater than or equal to 1.

In some embodiments, the above shortage cost type descriptions are presented as comments to the user.

V. Computing a Resource Sourcing Mix

Referring back to FIG. 8, after a user has specified forecast scenarios for resource demand, resource price and resource availability (step 100), specified correlations between forecast scenarios (step 122), and specified sourcing portfolio and financial inputs (steps 132, 140), procurement risk management system 40 computes an optimal resource sourcing mix (step 152).

As shown in FIG. 23, calculation engine 44 includes a cost and margin calculation engine 154 and a resource sourcing mix optimization engine 156, which are configured to cooperatively compute an optimal resource sourcing mix based on the received inputs.

A. Core Algorithm

Figure 24:
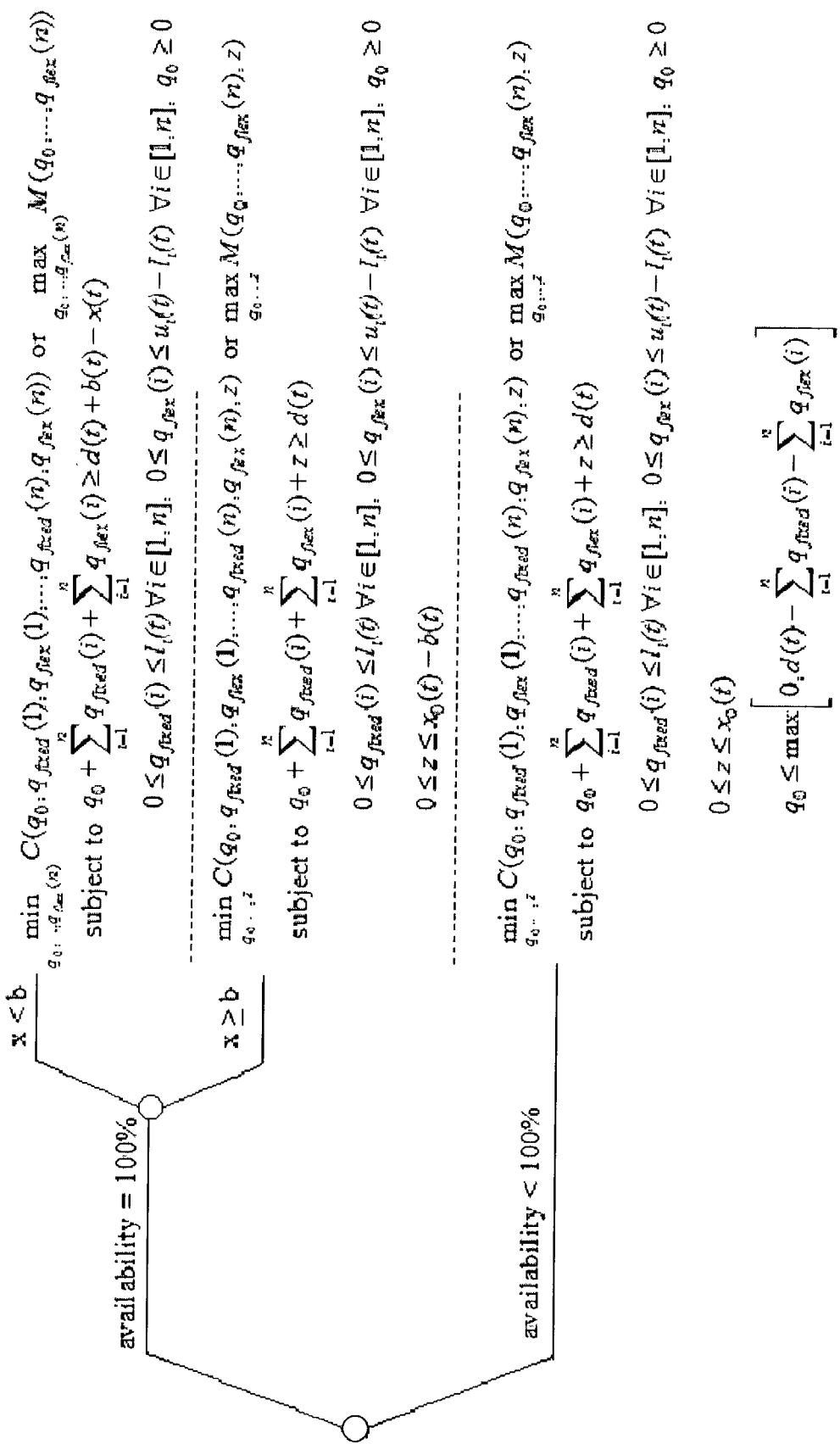
FIG. 24 is a graph of an algorithm for computing an optimal resource sourcing mix.

The core linear program algorithm for computing the optimal resource sourcing mix is shown in FIG. 24. The variables used in the linear program algorithm are defined in Appendix A. In the illustrated embodiment, calculation engine 44 is operable to compute the optimal resource sourcing mix as follows.

Referring to FIG. 25, it is noted that, buyer penalties on flexible quantity contracts essentially make the buyer's cost a non-linear function of purchase quantity. In some embodiments, a non-linear programming algorithm may be used for computing the optimal sourcing mix. In the illustrated embodiment, the fixed and flexible quantity purchases are formulated as separate decision variables and a linear program algorithm is used to compute the optimal sourcing mix. This linear program formulation requires an additional decision variable and additional constraint for each contract, relative to nonlinear programming implementations. However, linear programs generally are much more robust and efficient than non-linear programs.

Objective Function

At each period [t] and for each scenario combination of demand, price, and availability [d,p,a], calculation engine 44 calculates the mix of contracts to optimize the objective function. If shortage cost type is specified as fixed cost adder or price multiplier, then calculation engine 44 minimizes total cost in that period for that scenario, C[t,d,p,a]. If lost margin is the shortage cost type, then calculation engine 44 maximizes margin in that period and scenario, M[t,d,p,a]. (Note that minimizing total cost when shortage type is lost margin could be suboptimal. If margin<price, minimizing total cost would prefer shortages to no shortages.) These objective functions are specified to account for the opportunity cost of using inventory as follows:

$$C[t,d,p,a] = \text{total cost}[t,d,p,a] + z*p_z$$

$$M[t,d,p,a] = \text{margin}[t,d,p,a] - z*p_z$$

where z is the amount of inventory depleted for this period (assuming z>0), and $p_z$ is the "price" of the inventory; $p_z$ also is the price in the next period, in the same scenario:

$$p_z[t,p] = \text{price}[t+1, p]$$

In this way, excess inventory is depleted before contracts are exercised, unless the resource is bought from a contract for less than the inventory will be worth in the next period. In the last period k, there is no "next period" price, so the same rate of price decline as in the last period is used, provided that prices are still positive:

$$p_z[k,p] = \max[0, \text{price}[k,p] + (\text{price}[k,p] - \text{price}[k-1,p])]$$

Cash payments from penalties in the total cost or margin also are accounted for by computing material cost using the sum of fixed and flexible quantity purchases as the total purchase from each contract:

$$\text{material cost}(i) = q_{fixed}(i) * p_{fixed}(i) + q_{flex}(i) * p_{flex}(i)$$

Penalties are reported as part of an "other cash flows" metric (i.e., "cash payments to supplier" or "penalties to supplier"). Each item under this heading, including penalties, is detailed in the chart over time format, and the itemized NPV's are reported. The sum is reported on the main page under NPV of cash flows. The cash payment from penalties on contract i would be:

$$\text{penalty}(i) = r_i(l_i - q_{fixed}(i))$$

The default input for the penalty $r_i$ should be $r_i = p_i + \delta_i$, where $\delta_i$ is some arbitrarily small positive number (e.g., 0.1). This is equivalent to the buyer being forced to pay the full contract price for the minimum committed quantities. Essentially, this is equivalent to how the model works without rebates, since if the penalty was equal to the full contract price you would always buy up to the minimum committed quantity. An error checking function may be performed to make sure that if q_fixed_i<L_i, then q_flex_i=0. This should be a natural outcome of the linear program when penalties are positive and p_fixed_i<p_flex_i. Note that penalties also may apply to percentage of TAM contracts, though the variable L would be a function of the demand scenario. Note also that the penalty input on each contract may be specified as a function of time.

Decision Variables

Decision variables are the quantities to purchase from the fixed and flexible portions of each contract, from the spot market, and the amount to deplete from inventory. Let $q_{fixed}(i)$ be the quantity purchased from contract i up to the minimum quantity commitment during period t and scenario combination [d,p,a]. Let $q_{flex}(i)$ be the quantity purchased from contract i above the minimum quantity commitment and up to the maximum during period t and scenario combination [d,p,a]. Let $q_0$ denote the order quantity for at-market purchases at the price and availability specified in the scenario inputs. (Note that this spot "order" may be different from actual spot purchase quantity. If market availability is less than 100%, then the purchase will be subject to availability. Shortage costs would then be added to the objective function.) In the illustrated embodiment, the decision variables are [$q_0$, $q_{fixed}(1)$, $q_{flex}(1)$, $q_{fixed}(2)$, $q_{flex}(2)$, ..., $q_{fixed}(n)$, $q_{flex}(n)$, z]. For the case in which availability=100% and inventory is already less than the target buffer level, z is not a decision variable. Instead, inventory is accumulated back up to the target buffer level: z=x−b.

Constraints

Constraints are based on contract quantity min and max terms. Let $u_i$ be the maximum (upper bound) quantity limit on contract i, and let $l_i$ be the minimum (lower bound) purchase quantity on contract i. For percentage of TAM contracts, these bounds are contingent on the demand scenario. In addition, there is a constraint that the total purchase quantity in each period is greater than or equal to the total demand in a given period, after adjusting for inventory accumulation or depletion according to the inventory carrying policy. If minimum contract commitments were to exceed the demand, then more quantity would be purchased than needed.

Core Algorithm

1. Choose objective function. If shortage cost type is lost margin, then maximize margin. If shortage cost type is fixed cost adder or price multiplier, then minimize total cost.
2. Look up contract constraints. (% of TAM contract will require the quantity to be calculated based on the current demand scenario)
   a. From inputs, look up the lower bound on each contract purchase quantity. Must have l>0.
   b. From inputs, look up the upper bound on each contract purchase quantity. Must have u>l.
3. In each period and scenario [t,p,d,a] with non-zero probability, check state of availability, initial inventory, and period, and solve for optimal contract exercise quantities.
   a. If a=100% and x<b, then z=x−b. (Accumulate inventory back up to target buffer level.) Solve for $q_0, \ldots, q_n$ by solving the linear program.
   b. If a=100% and x>b, then solve linear program for $q_0, \ldots, q_{n,z}$ with the added constraint that the inventory depletion does not take you below the target buffer level.
   c. If a<100%, then solve linear program for $q_0, \ldots, q_{n,z}$ with the added constraint that the inventory depletion is less than or equal to the inventory buffer level at the beginning of the period. Also, add a constraint that the spot but order $q_0$ cannot be "inflated" so that the total order quantity exceeds the demand in that period.
4. Determine salvage value of excess inventory.
   a. Determine amount of excess inventory to sell off at market salvage value. If x>m, then sell off x−m (where m is the maximum allowed buffer level for the period specified in the inventory policy inputs). Report any excess inventory sold under the salvage value metrics.
5. Compute the actual total cost or margin for the period and scenario combination [t,d,p,a], based on optimal fixed and flex quantities and market availability for the quantity $q_0$. Also include the impact of salvage value on total cost and margin. Because actual total cost and margin do not include charges for depleting inventory, these values will be different from the C and M computed in the objective function of the linear program (LP).
6. Compute the inventory level for the beginning of the next period and the given scenario, x[t+1,d,p,a]. In the lost margin shortage cost type:

$$x(t+1) = \min\left[x(t) + q_0 * \text{availablity }[t,a] + \sum_{i=1}^{n}(q_{fixed}(i) + q_{flex}(i)) - d(t), m\right]$$

In the fixed cost adder and price multiplier model types:

$$x(t+1) = \min\left[x(t) + q_0 + \sum_{i=1}^{n}(q_{fixed}(i) + q_{flex}(i)) - d(t), m\right]$$

7. Use these inventory values for reporting high, expected, and low inventory stock in the output reports, as follows:

net_inv_change(t)=x(t+1)−x(t)

Pseudo code for implementing the above-described core resource sourcing mix algorithm is presented in Appendix B.

B. Algorithm For Incorporating Inventory Handling Policy

In the following embodiment, existing inventory is treated as a contract that competes with other contracts as part of optimal drawdown. There are three steps to computing the change in inventory state:

1. How is the initial inventory level relative to buffer level?
2. How does my current contract portfolio, demand, and availability state affect my inventory?
3. Is my final inventory above the maximum allowable level?
4. In last period, account for usage and depreciation of initial inventory.

Step 1: Check Inventory Level Against Target Buffer

At any given period, beginning inventory level x may be in one of three states relative to target buffer level b:

1. x<b→(a) try to replenish buffer stock subject to availability
2. x=b→(b) maintain inventory level, unless there is shortage or this is last period
3. x>b→(c) deplete inventory until x=b or you've satisfied all demand for the period Step 2, Case (a): Replenish Inventory Unless Short This case could occur if we started with a large inventory buy, or if we had a fixed quantity contract that forced us to buy more than we needed. Let z(t) be the net depletion of inventory during period t. The logic for inventory drawdown in this case would be:

$$z(t) = \begin{cases} x - b & \text{if availability } [t, a] = 1 \\ \min(s, x) & \text{if availability } [t, a] < 1 \end{cases}$$

where n is the number of periods in the model, and s is the shortage quantity after all contracts alternatives have been exhausted. (Note that last period is now treated same as other periods.) Excess demand refers to demand to be sourced on the open market, after using up contract alternatives. Time and scenarios are indexed by [t,d,p,a]. In the first case, you want to use up all inventory in the last period. Any remaining inventory is sold at the salvage value. In the second case, you want to replenish your inventory buffer. In the third case, you want to use the inventory to cover shortages.

Step 2, Case (b): Maintain Inventory Unless Short $$z(t) = \begin{cases} 0 & \text{if availability } [t, a] = 1 \\ \min(s, x) & \text{if availability } [t, a] < 1 \end{cases}$$

(Note that last period is now treated same as other periods.)

Step 2, Case (c): Deplete Inventory Down to Target Buffer if Possible $$z(t) =$$

-continued $$\begin{cases} \min(x - b, \text{excess demand } [t, d]) & \text{if availability } [t, a] = 1 \\ \max[\min(s, x), \min(\text{excess demand } [t, d], x - b)] \\ \text{if availability } [t, a] < 1 \end{cases}$$

(Note that last period is now treated same as other periods.) The third case in the "deplete" policy is complicated. If there is a shortage, we want to cover that shortage with inventory if possible. That is the min(s,x) term. If that still leaves us above the buffer level b, we still want to draw down inventory as much as we can subject to demand in that period. That is the second min term. So we will do the maximum of: cover shortage subject to inventory availability, or deplete inventory to the buffer level subject to that period's demand level.

Step 3: Check Ending Inventory Against Maximum Allowable

At the end of each period, we may be in one of two states:

1. x>m
2. x<m where m is the maximum allowable inventory level. In the first case, the model would sell off x−m units of inventory, and record under salvage value the proceeds:

salvage value[t,d,p,a]=(x−m)*price[t,p]*salvage value [t,a]

In the second case, no excess sales are made.

Step 4: In Last Period, Account for Usage and Depreciation of Initial Inventory

We allowed an initial inventory level to be carried into the first analysis period. Similarly, we will allow for remaining inventory in the last period to be carried into the future valued at market value (provided that it is below the maximum allowable inventory level in the last period). We will account for usage or depreciation of this inventory in the material cost NPV. (Note that in the model, buying and holding inventory while it depreciates results in a higher NPV of material costs than if you did not hold inventory. That is how depreciation is implicitly accounted for.) We decided not to include these cash flows in the per period reporting, since this could distort material costs in the first and last periods. The addition is computed as follows:

$$Cost_i = x_i * \text{price } [t = 1, p = \text{base}] - \sum_p \text{prob}(p) \left[ \frac{x_f * \text{price } [t = n, p]}{(1 + r)^{n/k}} \right]$$

where $Cost_i$ is the starting inventory addition to material cost NPV, $x_i$ is the initial inventory level input by the user, $x_f$ is the final inventory level after depletion and excess sales in the last period, r is the annual discount rate, and k is the number of periods in one year.

VI. Computing Output Metrics

Referring back to FIG. 8, based on the computed resource sourcing mix, calculation engine 44 is operable to compute one or more metrics for evaluating risk in the sourcing portfolio specified by the user (step 158).

A. "Buy at Market" Metrics Calculations
Lost Margin

Calculations would be as they are in the current version of HPrisk.xls. In a given period, with scenario indices [d,p,a] to designate current scenario, the calculations for the "buy at market" portfolio would be:

$$\text{material\_cost}[d,p,a] = \text{demand}[d] * \text{availability}[a] * \text{price}[p]$$

$$\text{shortage\_cost}[d,a] = \text{demand}[d] * (1-\text{availability}[a]) * \text{scenario\_unit\_margin}[d]$$

$$\text{total\_cost}[d,p,a] = \text{material\_cost}[d,p,a] + \text{shortage\_cost}[d,a]$$

$$\text{margin}[d,p,a] = \text{demand}[d] * \text{availability}[a] * \text{scenario\_unit\_margin}[d,p]$$

$$\text{scenario\_unit\_margin}[d,p] = \text{unit\_margin\_input}[d] + \text{price}[\text{base}] - \text{price}[p]$$

"scenario_unit_margin" is a function of both demand scenario and price scenario, as in the current model. This would be unaffected by the changes here, but I've included it for sake of completeness. Note that in this definition, the shortage reduces material cost, and actually reduces total cost if price>margin. This is why the margin metric is important under this shortage cost definition.

Fixed Cost/Unit Adder

Calculations would be as they are in the current version of HPrisk_HPCS.xls. In a given period, with scenario indices [d,p,a] to designate current scenario, the calculations for the "buy at market" portfolio would be:

$$\text{material\_cost}[d,p] = \text{demand}[d] * \text{price}[p]$$

$$\text{shortage\_cost}[d,a] = \text{demand}[d] * (1-\text{availability}[a]) * \text{short\_cost\_per\_unit}$$

$$\text{total\_cost}[d,p,a] = \text{material\_cost}[d,p] + \text{shortage\_cost}[d,a]$$

$$\text{margin}[d,p,a] = \text{demand}[d] * \text{scenario\_unit\_margin}[d,p] - \text{shortage\_cost}[d,a]$$

Note that scenario_unit_margin (defined above as a function of price scenario) is not the same as unit_margin_input (the value input by the user).

Price Multiplier

In a given period, with scenario indices [d,p,a] to designate current scenario, the calculations for the "buy at market" portfolio would be:

$$\text{material\_cost}[d,p,a] = \text{demand}[d] * \text{availability}[a] * \text{price}[p] + \text{demand}[d] * (1-\text{availablity}[a]) * \text{price}[p] * \text{multiplier}$$

$$\text{shortage\_cost}[\ ] = 0$$

$$\text{total\_cost}[d,p,a] = \text{material\_cost}[d,p,a]$$

$$\text{margin}[d,p,a] = \text{demand}[d] * \text{scenario\_unit\_margin}[d,p] - \text{demand}[d] * (1-\text{availablity}[a]) * \text{price}[p] * (\text{multiplier}-1)$$

B. Portfolio Metrics Calculations

The portfolio metrics would be calculated using the similar formulas as above for the "buy at market" portion of the portfolio, but the inventory depletion using buffer stock would need to be factored in. It could be used to cover any shortages remaining after contracts have been used. In these calculations, a qty_short_port variable is defined as follows:

$$\text{qty\_short\_port} = \max(0, \text{qty\_short} - \text{inv\_used})$$

where qty_short=demand_excess*(1−.avail(t, a)) as previously defined.

Lost Margin Calculations $$\text{metrics.matl.port.fx}(t, d, p, a) = \text{matl\_cost\_1} + \text{matl\_cost\_2} + (\text{qty\_residual} - \text{qty\_short\_port}) * \text{price}(t, p)$$

$$\text{metrics.short.port.fx}(t, d, p, a) = \text{qty\_short\_port} * \text{scenario\_unit\_margin}$$

$$\text{metrics.ttl.port.fx}(t, d, p, a) = \text{metrics.matl.port.fx}(t, d, p, a) + \text{metrics.short.port.fx}(t, d, p, a)$$

$$+ \text{metrics.storage.fx}(t, d, p, a) - \text{metrics.inv\_salvage.fx}(t, d, p, a) + (.\text{cash\_out\_1}(t) + \text{cash\_out\_2}(t))$$

$$\text{metrics.margin.port.fx}(t, d, p, a) = (\text{scenario\_unit\_margin} + .\text{price}(t, p) - \text{price\_1}) * \text{qty\_1}$$

$$+ (\text{scenario\_unit\_margin} + .\text{price}(t, p) - \text{price\_2}) * \text{qty\_2}$$

$$+ (\text{qty\_residual} - \text{qty\_short\_port}) * \text{scenario\_unit\_margin}$$

$$+ (\text{inv\_used} - \text{qty\_excess}) * \text{scenario\_unit\_margin}$$

$$- \text{qty\_salvaged} * (1 - \text{user\_input.recover}(t, a)) * \text{price}(t, p)$$

$$- \text{metrics.storage.fx}(t, d, p, a) - \text{metrics.deprec.fx}(t, d, p, a) - (.\text{cash\_out\_1}(t) + \text{cash\_out\_2}(t))$$

Fixed Cost Adder Calculations $$\text{metrics.matl.port.fx}(t, d, p, a) = \text{matl\_cost\_1} + \text{matl\_cost\_2} + \text{qty\_residual} * \text{price}(t, p)$$

$$\text{metrics.short.port.fx}(t, d, p, a) = \text{qty\_short\_port} * .\text{penalty}(t)$$

$$\text{metrics.ttl.port.fx}(t, d, p, a) = \text{metrics.matl.port.fx}(t, d, p, a) + \text{metrics.short.port.fx}(t, d, p, a)$$

$$+ \text{metrics.storage.fx}(t, d, p, a) - \text{metrics.inv\_salvage.fx}(t, d, p, a) + (.\text{cash\_out\_1}(t) + \text{cash\_out\_2}(t))$$

$$\text{metrics.margin.port.fx}(t, d, p, a) = (\text{scenario\_unit\_margin} + .\text{price}(t, p) - \text{price\_1}) * \text{qty\_1}$$

$$+ (\text{scenario\_unit\_margin} + .\text{price}(t, p) - \text{price\_2}) * \text{qty\_2}$$

$$+ \text{qty\_residual} * \text{scenario\_unit\_margin} - \text{metrics.short.port.fx}(t, d, p, a)$$

$$+ (\text{inv\_used} - \text{qty\_excess}) * \text{scenario\_unit\_margin}$$

$$- \text{qty\_salvaged} * (1 - \text{user\_input.recover}(t, a)) * \text{price}(t, p)$$

$$- \text{metrics.storage.fx}(t, d, p, a) - \text{metrics.deprec.fx}(t, d, p, a) - (.\text{cash\_out\_1}(t) + \text{cash\_out\_2}(t))$$

Price Multiplier Calculations $$\text{metrics.matl.port.fx}(t, d, p, a) = \text{matl\_cost\_1} + \text{matl\_cost\_2} + \text{qty\_residual} * .\text{price}(t, p)$$

$$\text{metrics.short.port.fx}(t, d, p, a) = \text{qty\_short\_port} * .\text{price}(t, p) * (.\text{penalty}(t) - 1)$$

metrics.ttl.port.fx($t, d, p, a$)=metrics.matl.port.fx($t, d, p, a$)+metrics.short.port.fx($t, d, p, a$)__

+metrics.storage.fx($t, d, p, a$)−metrics.inv_salvage.fx($t, d, p, a$)+(.cash_out__1($t$)+cash_out__2($t$))

metrics.margin.port.fx($t, d, p, a$)=(scenario_unit_margin+.price($t, p$)−price__1)*qty__1__

+(scenario_unit_margin+.price($t, p$)−price__2)*qty__2__

+qty_residual*scenario_unit_margin−metrics.short.port.fx($t, d, p, a$)__

+(inv_used−qty_excess)*scenario_unit_margin__

−qty_salvaged*(1−user_input.recover($t, a$))*.price($t, p$)__

−metrics.storage.fx($t, d, p, a$)−metrics.deprec.fx($t, d, p, a$)−(.cash_out__1($t$)+cash_out__2($t$))

C. Inventory-Related Output Metrics

In addition to computing out how much inventory is depleted in each period, we will want to track and compute certain output metrics related to inventory, including expected inventory stock, standard deviation of inventory stock, expected value of inventory stock, expected proceeds from sale of excess inventory, expected inventory finance and storage cost, expected inventory depreciation value, and expected total cost associated with carrying inventory.

The expected value of inventory stock is calculated as: expected value of inventory[$t$]=sum (prob[$p,d,a$]*inventory stock[$t,p,d,a$]*price[$t,p$]), where [$p,d,a$] designate the price, demand, and availability scenario combinations The "proceeds from sales of excess inventory" is calculated as: salvage value[$t,d,p,a$]=($x−m$)*price[$t,p$]*salvage value[$t,a$]. This metric is reported both in nominal terms in every period and in the NPV column for the NPV across all periods.

Per period cost is computed as: expected finance & storage cost ($t$)=sum(prob[$d,p,a$]* inventory value[$t,d,p,a$]*((1+annual finance cost+annual storage cost)^(1/k)−1)), where k is the number of periods per year in the model, and the annual costs are percentages input on the advanced inputs sheet.

Expected depreciation cost is computed as: expected depreciation[$t$]=sum(prob[$d,p,a$]* inventory stock[$t,d,p,a$]*(price[$t+1,p$]−price[$t,p$])).

In the last period, the depreciation cost would be: expected depreciation[$t$]=sum(prob[$d,p,a$]*inventory stock[$t−1,d,p,a$]*(price[$t, p$]−price[$t,p$])). Note: in the calculation of expected price change, we can either take the difference between expected prices, or the expected difference between prices. That is, $E(p[t+1]−p[t])=E(p[t+1])−E(p[t])$, if we assume $p[t+1]$ and $p[t]$ are independent random variables. In some embodiments, these variables may be treated as being correlated based on assumptions about transition probabilities from one state (high/base/low) to another.

The summary measure of inventory carrying cost is computed as: expected total cost associated with carrying inventory=exp finance & storage cost+exp depreciation cost.

Relationship with Other Metrics

Inventory metrics will impact both the reported total cost and margin:

1. Add the "finance & storage cost" to the "total cost" and subtract it from "margin", in each period and in each scenario.
2. Subtract the salvage value (for each period and NPV) from the total cost and add it to the margin in every period period.
3. Add the "starting inventory addition to material cost NPV" to the NPV of material cost.

When the total cost or margin values are rolled into an NPV, or the standard deviations are calculated, it will then have all the inventory effects factored in. Note that the "depreciation cost" is not added to total cost or margin, as it is already considered in our material cost expenditures.

Contract Portfolio vs. Buy-At-Market

In the illustrated embodiment, the inventory policy is applied only to the contract portfolio. This will allow users to compare the benefits of the inventory policy to a buy-at-market strategy.

VII. Reporting Output Metrics

Referring to FIG. 8, after procurement risk management system 40 computes the output metrics based on the computed resource sourcing mix (step 158), the metrics are report to the user for evaluation (step 160). As explained in detail below, the computed metrics may be presented in a way that provides a comparison between the specified procurement portfolio with sourcing contracts and a pure buy-at-market portfolio for the procurement metrics: material cost, shortage cost, inventory cost, total cost, and margin. In addition, the graphical user interface 42 also may present: (a) summary measures of high, base, and low net present value for each metric; (b) detailed graphical output of high, base, and low values for each metric over time; and (c) detailed comparison of the risk distributions of net present value for each of the above-mentioned procurement metrics. The procurement risk management system 40 also presents the computed optimal exercise policy for each structured contract in the specified portfolio.

Figure 26:
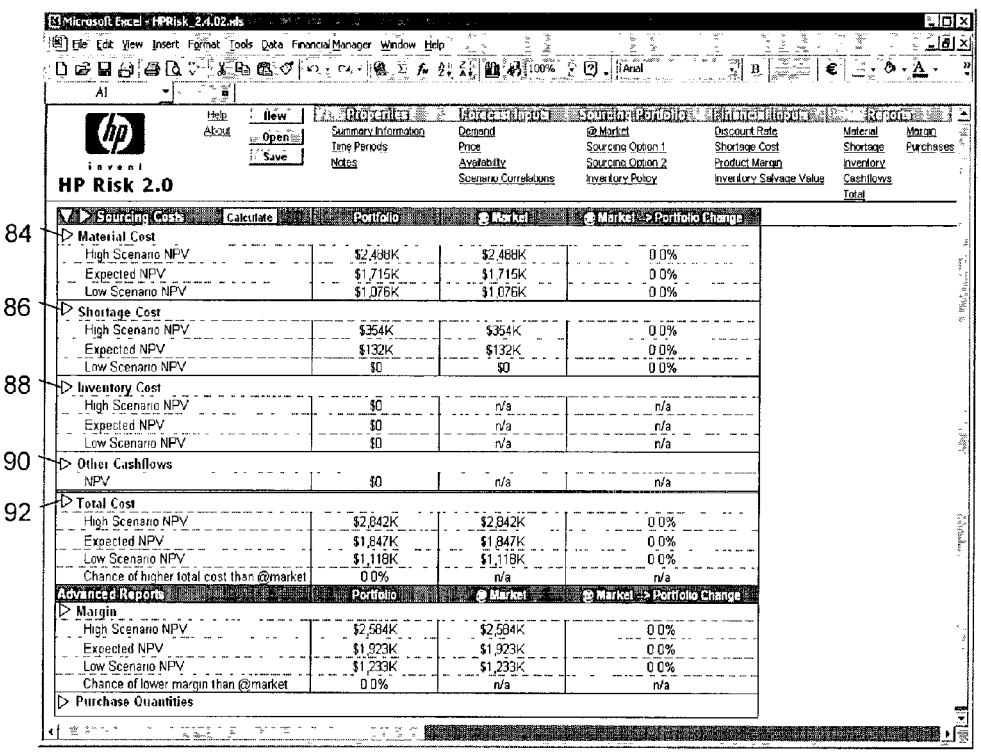
FIG. 26 is a graphical user interface presenting multiple metrics for evaluating risk in a resource sourcing portfolio.
Figure 27:
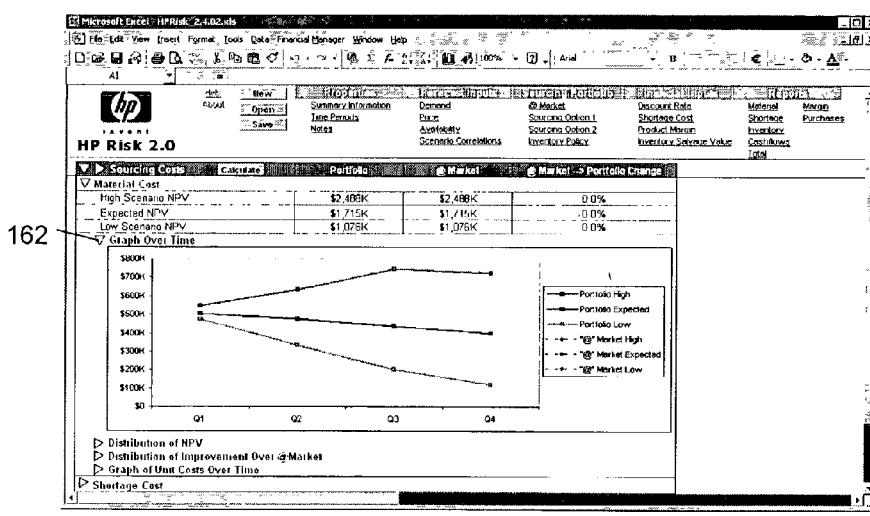
FIG. 27 is a graphical user interface presenting a graph of material cost associated with a resource sourcing mix plotted as a function of time for multiple scenarios.
Figures 28, 29:
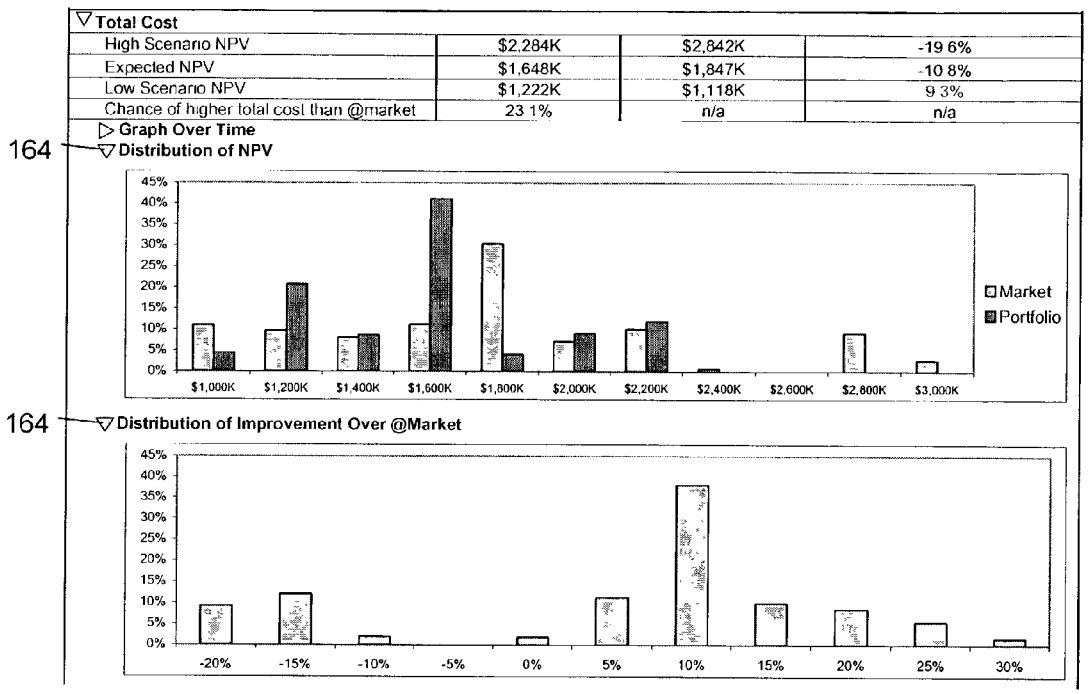
FIG. 28 is a graphical user interface presenting distributions of material costs associated with a specified sourcing portfolio and a buy-at-market sourcing strategy, and a distribution of material cost improvement of a specified sourcing portfolio relative to a buy-at-market sourcing strategy.
FIG. 29 is a graphical user interface through which a user may specify the terms of an inventory-buy forward contract.

Referring to FIGS. 26-28, in the illustrated embodiment, a user may select an output metric report by clicking on a metric report display button in the Reports control panel. Each output metric is presented to a user in a respective report window. Each output metric is reported for each sourcing strategy (i.e., portfolio and buy-at-market) and for each scenario (i.e., high, base, and low). In addition, the change in each output metric from a buy-at-market to the specified portfolio sourcing strategy is reported so that a user may compare the portfolio relative to a buy-at market sourcing strategy along each output metric dimension. In addition to presenting net present values for each output metric at the end of the planning horizon, a user may select one of the Details buttons 84, 86, 88, 90, 92 to display alternative reports that may be presented for each output metric. In the illustrated embodiment, the following report options are available for each output metric.

1. Material Cost
   a. Graph Over Time
   b. Distribution of NPV
   c. Distribution of Improvement Over@Market
2. Shortage Cost
   a. Graph Over Time
   b. Distribution of NPV
   c. Distribution of Improvement Over @Market
   d. Number of Shortage Units
3. Inventory Cost
   a. Graph Over Time
   b. Distribution of NPV
   c. Inventory Cost Breakdown
   d. Inventory Stock Levels
4. Other Cash Flows
   a. Graph Over Time 5. Total Cost
   a. Graph Over Time
   b. Distribution of NPV
   c. Distribution of Improvement Over @Market
   d. Graph of Unit Costs Over Time
6. Margin
   a. Graph Over Time
   b. Distribution of NPV
   c. Distribution of Improvement Over @Market
7. Purchase Quantities
   a. @Market
   b. Sourcing Option 1
   c. Sourcing Option 2
   d. Inventory Depleted
   e. Residual Demand After $1^{st}$ Contract Referring to FIGS. 27 and 28, for example, a user may display a graph of material cost over time for each scenario by selecting a Graph Over Time button 162 (FIG. 27). In addition, a user may display a graph of the distribution of the net present value (NPV) of total cost by selecting a Distribution of NPV button 164, or display a graph of the distribution of portfolio improvement over a buy-at-market sourcing strategy by selecting a Distribution of Improvement Over @Market button 166.

VIII. Evaluating an Inventory Buy Sourcing Option

In one exemplary use of procurement risk management system 40, a user may use procurement risk management system 40 to determine whether to purchase inventory at an offered price that is below the current market price and how much inventory to buy as follows. Among the factors that would influence the inventory buy decision are future market prices (e.g., future market prices could be cheaper than the offered inventory buy price) and future demand (e.g., the inventory buy quantity could be too high if demand falls, resulting in excess inventories and inventory write-downs).

Referring to FIG. 29, the inventory buy may be modeled as a fixed quantity purchase in the first period with the offer price entered as a fixed price term. In the illustrated example, the inventory buy quantity is 400,000 units and the offer price is $4.50 per unit. After receiving the inventory buy information, as well as the forecast inputs and financial inputs, procurement risk management system 40 computes an optimal sourcing mix and the output metrics.

The user then must specify which procurement metric to use to evaluate the inventory buy. In general, this decision is based on the selected shortage cost type. The margin metric should be used if shortage cost is specified as lost margin. The total cost metric should be used if shortage cost is specified as a fixed cost adder or price multiplier.

Figure 30:
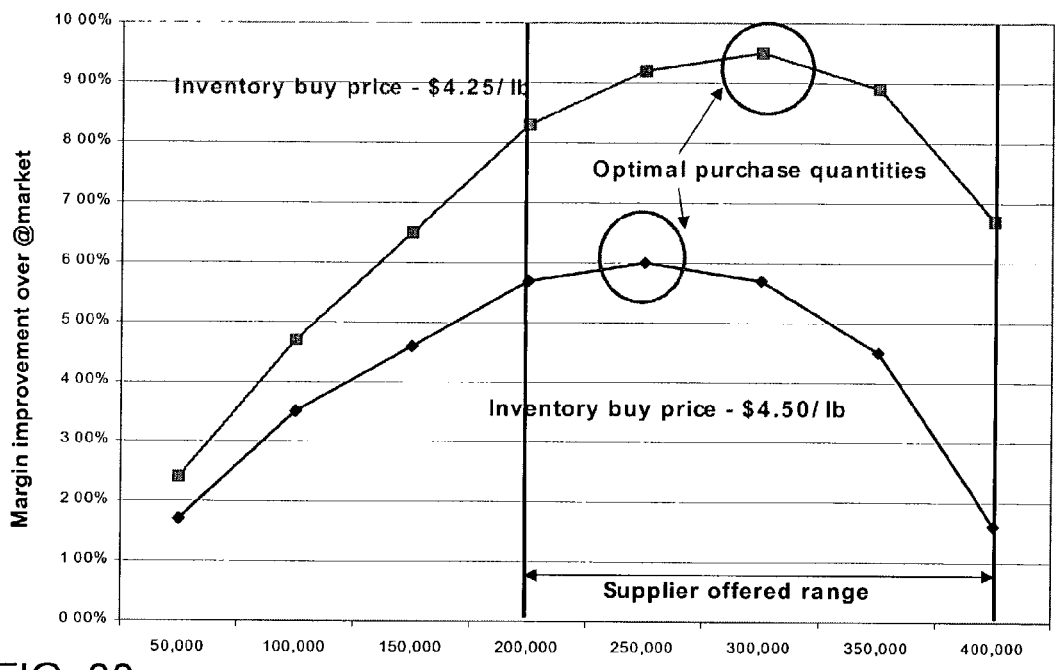
FIG. 30 are graphs of margin improvement of an inventory buy relative to a buy-at-market sourcing strategy plotted as a function of inventory buy volume.

As shown in FIG. 30, an optimal inventory buy volume may be determined from a plot of margin vs. inventory buy volume. In some cases, an optimal inventory buy volume also may be determined from a plot of total cost vs. inventory buy volume.

Figure 31:
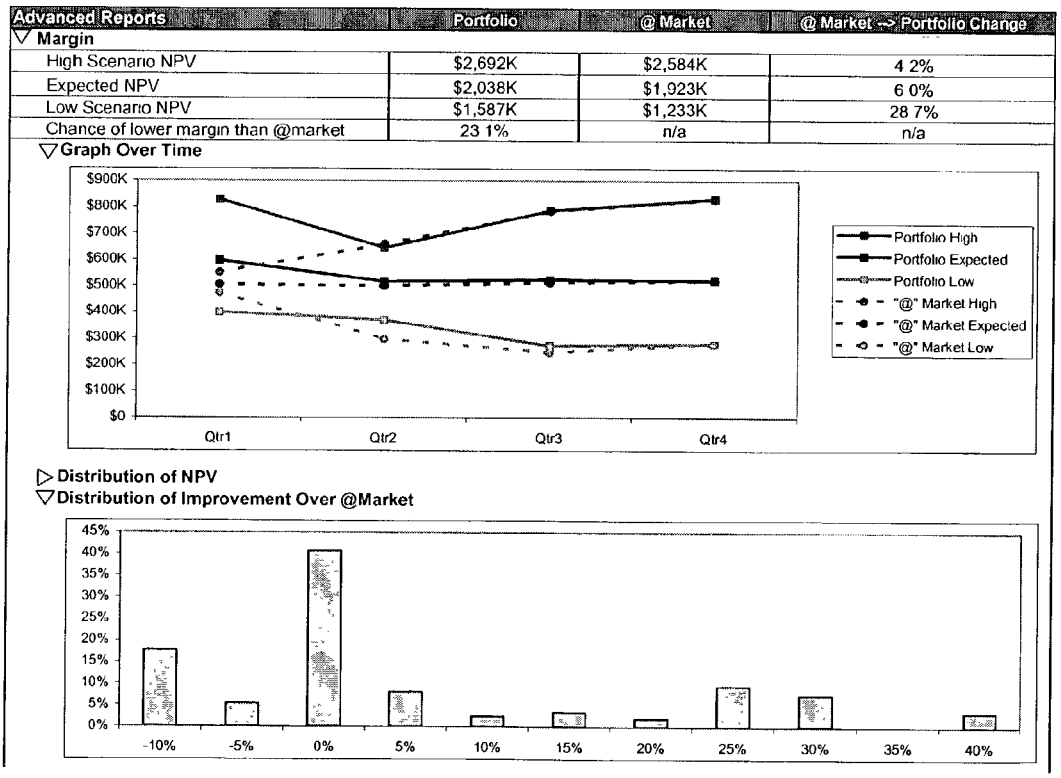
FIG. 31 is a graphical user interface presenting a graph of margins plotted as a function of time and a distribution of margin improvement of an inventory buy relative to a buy-at-market sourcing strategy.

Referring to FIG. 31, additional margin data computed by procurement risk management system 40 may be used to evaluate risk in the inventory buy sourcing option. For example, the "Chance of lower margin than @market" metric reveals that the inventory has a 23.1% chance of improving margins. The "Distribution of Improvement Over @Market" plot, however, reveals that the downside risk of a 5% chance of 5% worse margins than buying-at-market and an 18% chance of 10% worse margins than buying-at-market. With this information a procurement manager may evaluate the risks associated with an inventory buy and determine whether a particular inventory buy should be exploited to lower costs and increase margins.

IX. Evaluating Sourcing Options to Achieve Portfolio Cost Savings

In one exemplary use of procurement risk management system 40, a user may use procurement risk management system 40 to evaluate different sourcing options in terms of portfolio cost savings and assurance of supply as follows.

Referring to FIG. 32, in this illustrative example, the sourcing options are: (a) a fixed price schedule for a fixed quantity in the range of 75,000-140,000/quarter (Sourcing Option 1); and (b) a fixed price schedule for a flexible quantity in the range of 100,000/quarter (Sourcing Option 2). The sourcing contract quantities for a hypothetical sourcing portfolio based on Sourcing Options 1 and 2 are entered in the appropriate Max quantity available (cap) and the Min quantity commitment (floor) data entry boxes for each quarter. Sourcing option 1 includes data only in the Min quantity commitment (floor) data entry boxes, whereas Sourcing Option 2 includes data in both sets of quantity data entry boxes. The sourcing contract price schedules are specified in the price data entry boxes for each quarter.

After receiving the sourcing contract information, as well as the forecast inputs and financial inputs, procurement risk management system 40 computes an optimal sourcing mix and the output metrics.

Referring to FIG. 33, the performance of the hypothetical sourcing portfolio may be evaluated by referring to the output metrics in the Sourcing Costs window. For example, the hypothetical sourcing portfolio is projected to do better than buying-at-market for the high and expected scenarios in terms of material cost, shortage cost and total cost. Only in the low scenario will the hypothetical sourcing portfolio do worse the buy-at-market sourcing strategy.

Figure 34:
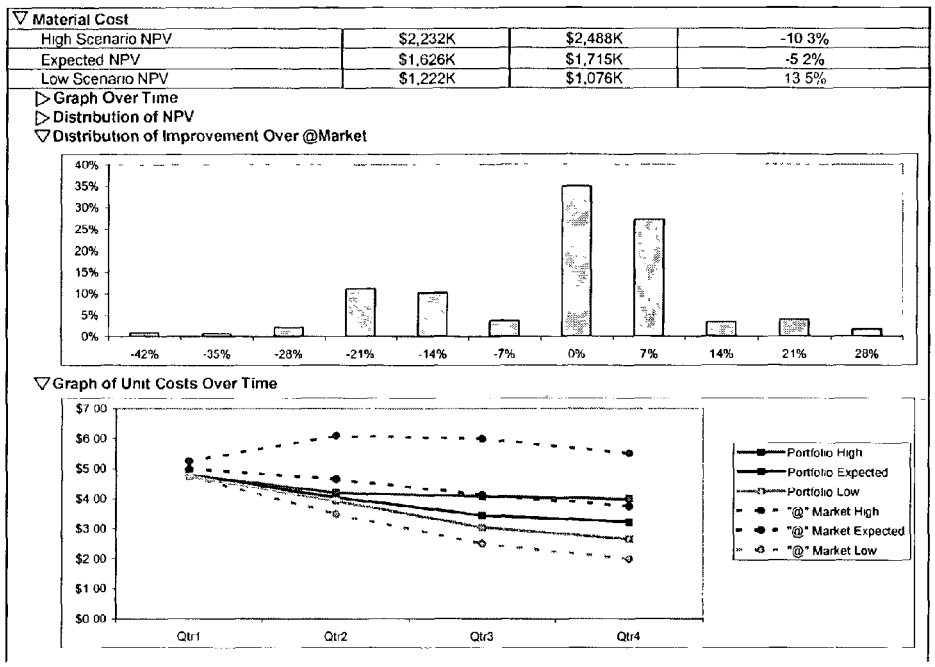
FIG. 34 is a graphical user interface presenting a distribution of material cost improvement over spot market purchases and a graph of unit costs over time for multiple scenarios.

Referring to FIG. 34, the graph of Units Costs Over Time reveals that the hypothetical sourcing portfolio produces high price predictability and better unit prices than buying-at-market for the base and high scenarios.

Figure 35:
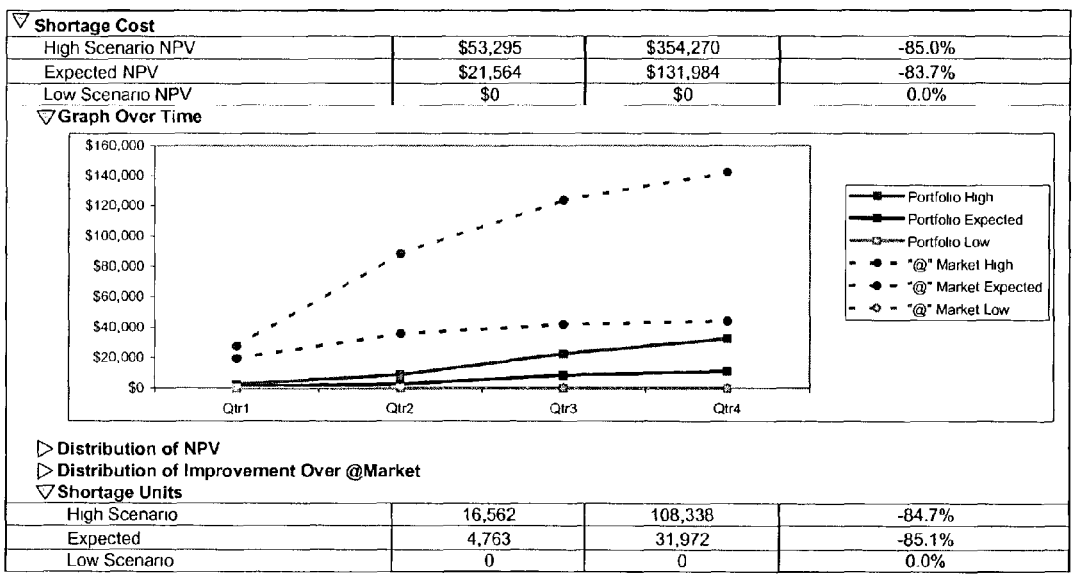
FIG. 35 is a graphical user interface presenting a graph of shortage cost over time for the sourcing portfolio of FIG. 32.

Referring to FIG. 35, the shortage cost Graph Over Time reveals that the hypothetical sourcing portfolio has substantially reduced shortage costs relative to the buy-at-market sourcing strategy.

Figure 36:
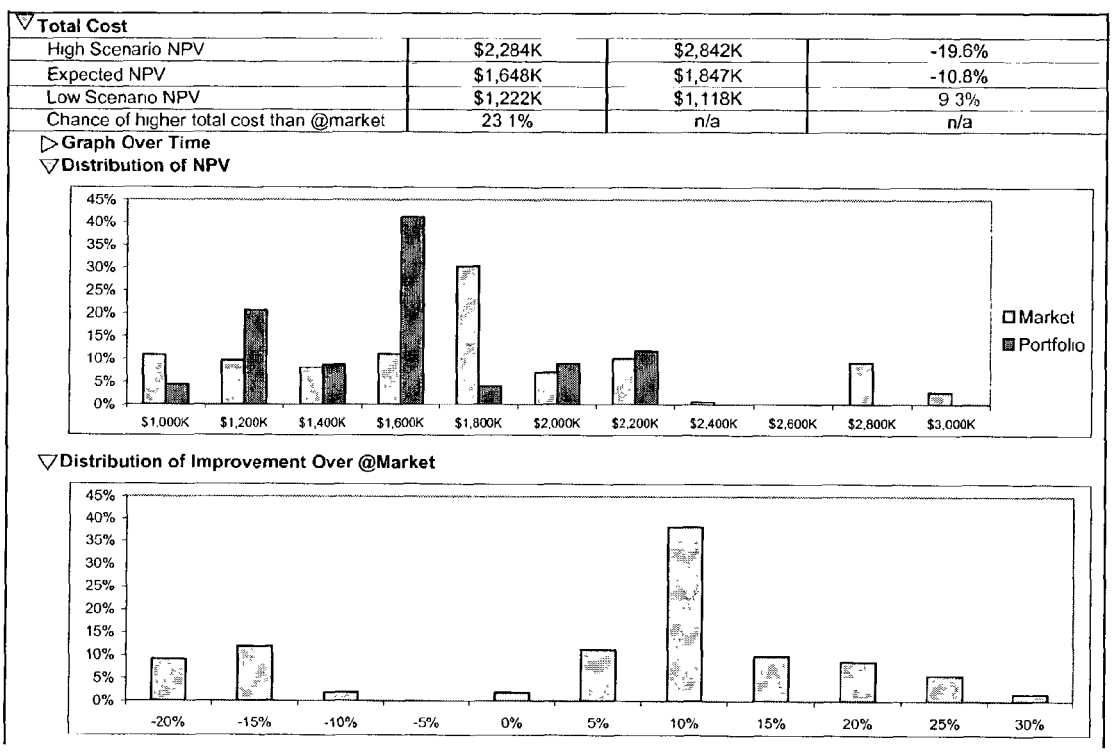
FIG. 36 is a graphical user interface presenting distributions of material cost for the sourcing portfolio of FIG. 32 and spot market purchases and a distribution of material cost improvement over spot market purchases.

Referring to FIG. 36, the total cost Distribution of NPV reveals that the hypothetical sourcing portfolio does not have the high total cost scenarios that are present in the buy-at-market sourcing option. Expected total costs for the hypothetical sourcing portfolio improve by over 10% relative to buying-at-market, and the chance of higher total cost than buying-at-market is 23%.

With this information a procurement manager may evaluate the risks associated with the hypothetical sourcing portfolio. A set of different hypothetical sourcing portfolios may be generated and evaluated to determine an optimal sourcing strategy based on the two sourcing contract options.

X. CONCLUSION

Other embodiments are within the scope of the claims.

The systems and methods described herein are not limited to any particular hardware or software configuration, but rather they may be implemented in any computing or processing environment, including in digital electronic circuitry or in computer hardware, firmware, or software.

APPENDIX A

The variables used in the linear program algorithm of FIG. 19 are defined below. All variables apply for a given period $t$, and a given state of demand, price, and availability scenarios [d,p,a] (e.g., [d,p,a] = [low,high,low]).

$C$: the total cost for the period and scenario, with the added cost from the inventory purchase "price" (see description of inventory price under the objective function section)

$c(i)$: the material cost associated with contract i $M$: the total margin for the period and scenario, less the added cost from the inventory purchase "price" (Note that minimizing total cost when shortage type is lost margin could be suboptimal. If margin < price, minimizing total cost would prefer shortages to no shortages.)

$q_{fixed}(i)$: the quantity to purchase from the fixed quantity portion ( $< l_i$ ) of contract $i$ in the given period. There are $n$ contracts.

$q_{flex}(i)$: the quantity to purchase from the flexible portion of contract $i$ in the given period. There are $n$ contracts.

$q_0$: the quantity allocated to spot market purchases $p_{fixed}(i)$: the contract price per unit for the fixed quantity portion of contract i $p_{flex}(i)$: the contract price per unit for the flex quantity portion of contract i; in the LP formulation, we require $p_{fixed}(i) \leq p_{flex}(i)$ $r_i$: the penalty per unit for each unit below the minimum commitment $l_i$ on contract i ; we require the input $r_i \geq 0$ $l_i$: the minimum purchase quantity required in period $t$ under contract $i$ (user input, set to zero as a default)

$u_t$: the maximum purchase quantity possible in period $t$ under contract $i$ (user input)

$x$: the inventory level at the beginning of the period $b$: the target level for the inventory buffer for the current period (user input)

$m$: the maximum allowable level of inventory in the buffer (user input)

$z$: the depletion in inventory for the current period $d(t)$: the demand in period t for the current demand scenario (forecast scenario input)

APPENDIX B

The following section details the calculations used in the objective function. The cost_objective(t, d, p, a) or margin_objective(t, d, p, a) is the objective function that will be optimized, depending on the shortage cost type. Margin is maximized and total cost is minimized. Note that when margin is maximized, total cost metrics are not calculated in the linear program. Likewise, when cost is minimized, margin metrics are not calculated in the linear program.

Notes on pseudo code convention in the code below:

- wherever the subscript _i appears, it denotes that a variable should be assigned to each contract with the contract number. For example, for a portfolio of 3 contracts mtl_cost_i => mtl_cost_1, mtl_cost_2, mtl_cost_3
- except as noted, as variable names are used as defined in VBA2 code
- some variable names are different than in the formulas above. they correspond to the above variables as follows: $q_{fixed}(i)$ = qty_fixed_i, $q_{flex}(i)$ = qty_flex_i, $p_{fixed}(i)$ = price_fixed_i, $p_{flex}(i)$ = price_flex_i, unit_penalty_i = $r_i$, qty_min_i = $l_i$, $p_z$ = price_inv, z = inv_used

*Some initial calculations are common to all three types of objective functions calculation. Before stepping into a particular objective function routine, calculate:*

' -- qty_residual variable is equivalent to q_0 decision variable in our LP formulation qty_residual = q_0

' -- see VBA2 code for some of the other variables ref'd below, for example inv_salvage ' -- For all contracts, define mtl_cost and penalty according to these formulas mtl_cost_i = qty_fixed_i * price_fixed_i + qty_flex_i * price_flex_i penalty_i = unit_penalty_i * (qty_min_i - qty_fixed_i)

' -- Calculate a penalty reporting metric metrics.penalty.fx(t, d, p, a) = sum(penalty_i)

' -- Define the "price" for the inventory used in that period, depending on whether or not this is last period If period < n, then price_inv(t, p) = price(t+1,p)

else price_inv(t, p) = max(0, price(t, p) + ( price(t, p) - price(t-1, p) ) )

*Portfolio and objective function calculations:*

Define a new variable:

qty_short_port = max(0, qty_short - inv_used)

where qty_short = demand_excess * (1 - .avail(t, a)) as previously defined.

If user_input.shortage_cost_type = lost_margin Then metrics.matl.port.fx(t, d, p, a) = sum(matl_cost_i) + qty_residual * .avail(t, a) * .price(t, p)

metrics.short.port.fx(t, d, p, a) = qty_short_port * scenario_unit_margin metrics.ttl.port.fx(t, d, p, a) = metrics.matl.port.fx(t, d, p, a) + metrics.short.port.fx(t, d, p, a) _

+ metrics.storage.fx(t, d, p, a) - metrics.inv_salvage.fx(t, d, p, a) + sum(.cash_out_i(t)) _

+ metrics.penalty.fx(t, d, p, a)

metrics.margin.port.fx(t, d, p, a) = sum( (scenario_unit_margin + .price(t, p) - price_fixed_i) * qty_fixed_i _ )

+ sum( (scenario_unit_margin + .price(t, p) - price_flex_i) * qty_flex_i _ )

+ (qty_residual - qty_short_port) * scenario_unit_margin _

+ (inv_used - qty_excess) * scenario_unit_margin _

- qty_salvaged * (1 - user_input.recover(t, a)) * .price(t, p) _

-46-

- metrics.storage.fx(t, d, p, a) - metrics.deprec.fx(t, d, p, a) -
sum(.cash_out_i(t)) _

- metrics.penalty.fx(t, d, p, a)

margin_objective(t, d, p, a) = metrics.margin.port.fx(t, d, p, a) + inv_used *
(.price(t, p) - price_inv)

ElseIf user_input.shortage_cost_type = fixed_cost_addr metrics.matl.port.fx(t, d, p, a) = sum(matl_cost_i) + qty_residual * .price(t, p)

metrics.short.port.fx(t, d, p, a) = qty_short_port * .penalty(t)

metrics.ttl.port.fx(t, d, p, a) = metrics.matl.port.fx(t, d, p, a) +
metrics.short.port.fx(t, d, p, a) _

+ metrics.storage.fx(t, d, p, a) - metrics.inv_salvage.fx(t, d, p, a) +
sum(.cash_out_i(t)) _

+ metrics.penalty.fx(t, d, p, a)

metrics.margin.port.fx(t, d, p, a) = sum( (scenario_unit_margin + .price(t, p) -
price_fixed_i) * qty_fixed_i _ )

+ sum( (scenario_unit_margin + .price(t, p) - price_flex_i) * qty_flex_i
_ )

+ qty_residual * scenario_unit_margin - metrics.short.port.fx(t, d, p, a) _

+ (inv_used - qty_excess) * scenario_unit_margin _

- qty_salvaged * (1 - user_input.recover(t, a)) * .price(t, p) _

- metrics.storage.fx(t, d, p, a) - metrics.deprec.fx(t, d, p, a) -
sum(.cash_out_i(t)) _

- metrics.penalty.fx(t, d, p, a)

cost_objective(t, d, p, a) = metrics.ttl.port.fx(t, d, p, a) + net_inv_depletion *
price_inv ElseIf user_input.shortage_cost_type = price_multiplier Then metrics.matl.port.fx(t, d, p, a) = sum( matl_cost_i) + qty_residual * .price(t, p)

metrics.short.port.fx(t, d, p, a) = qty_short_port * .price(t, p) * (.penalty(t) - 1)

metrics.ttl.port.fx(t, d, p, a) = metrics.matl.port.fx(t, d, p, a) + metrics.short.port.fx(t, d, p, a) _

+ metrics.storage.fx(t, d, p, a) - metrics.inv_salvage.fx(t, d, p, a) + sum(.cash_out_i(t)) _

+ metrics.penalty.fx(t, d, p, a)

metrics.margin.port.fx(t, d, p, a) = sum( (scenario_unit_margin + .price(t, p) - price_fixed_i) * qty_fixed_i _ )

+ sum( (scenario_unit_margin + .price(t, p) - price_flex_i) * qty_flex_i _ )

+ qty_residual * scenario_unit_margin - metrics.short.port.fx(t, d, p, a) _

+ (inv_used - qty_excess) * scenario_unit_margin _

- qty_residual * (1 - .avail(t, a)) * .price(t, p) * (.penalty(t) - 1#) _

- qty_salvaged * (1 - user_input.recover(t, a)) * .price(t, p) _

- metrics.storage.fx(t, d, p, a) - metrics.deprec.fx(t, d, p, a) - sum(.cash_out_i(t)) _

- metrics.penalty.fx(t, d, p, a)

cost_objective(t, d, p, a) = metrics.ttl.port.fx(t, d, p, a) + net_inv_depletion * price_inv

What is claimed is:

1. A procurement risk management method implemented by a computer including a processor, comprising:
   using the processor to compute a resource sourcing mix from a sourcing portfolio of one or more forward contracts, spot market purchases, and inventory depletion for each period of a planning horizon based on forecast scenarios for resource demand, resource price, and resource availability and a specified inventory carrying policy for the resource; and
   based upon the computed resource sourcing mix, using the processor to compute one or more metrics for evaluating the sourcing portfolio.

2. The method of claim 1, wherein the inventory carrying policy is specified by minimum and maximum inventory targets for each period of the planning horizon.

3. A procurement risk management system, comprising a software calculation engine, the software calculation engine implemented as programming on a processor, the software calculation engine, when executed, operable to:
   compute a resource sourcing mix from a sourcing portfolio of one or more forward contracts, spot market purchases, and inventory depletion for each period of a planning horizon based on forecast scenarios for resource demand, resource price, and resource availability and a specified inventory carrying policy for the resource; and
   based upon the computed resource sourcing mix, compute one or more metrics for evaluating the sourcing portfolio.

4. The method of claim 3, wherein computing the resource sourcing mix comprises drawing on buffer stock inventory to prevent shortages during each period of the planning horizon.

5. The method of claim 3, wherein computing the resource sourcing mix comprises drawing on buffer stock inventory as if buffer stock were a forward contract with 100% availability.

6. The method of claim 5, wherein buffer stock inventory is drawn as if buffer stock inventory were a forward contract with a price discounted below market price.

7. The method of claim 6, wherein the buffer stock inventory forward contract price is discounted based on an expected drop in resource price from a current period to a subsequent period.

8. The method of claim 4, wherein computing the resource sourcing mix comprises selling excess inventory above the target buffer stock level at a specified salvage value price.

9. The method of claim 8, wherein selling excess inventory comprises either selling inventory to cover shortages subject to availability of selling inventory down to the target buffer stock level subject to demand, whichever is greater.

10. The method of claim 8, wherein excess inventory is sold before contracts are exercised unless a contract exercise price in a current period is less than expected inventory value in a subsequent period.

11. The method of claim 3, wherein computing the resource sourcing mix comprises buying inventory after a shortage has occurred to replenish inventory to the buffer stock level.

12. The method, of claim 1, wherein computing the resource sourcing mix comprises optimizing an objective function for each period of the planning horizon for each scenario combination of demand, price, and availability.

13. The method of claim 12, wherein optimizing the objective function comprises maximizing margin.

14. The method of claim 12, wherein optimizing the objective function comprises minimizing total cost.

15. The method of claim 12, wherein computing the resource sourcing mix comprises selecting the objective function based on a specified shortage cost type.

16. The method of claim 1, wherein the resource sourcing mix is computed based on a selected shortage cost type.

17. The method of claim 16, wherein the shortage cost type is selected from lost margin, fixed cost per unit adder, and price multiplier.

18. The method of claim 16, wherein shortage cost values are specified across periods and across different scenarios.

19. The method of claim 18, wherein shortage cost is constant in any given period and demand scenario.

20. The method of claim 18, wherein shortage cost values are specified based on availability level.

21. The method of claim 1, wherein the resource sourcing mix is computed based on a supplier penalty.

22. The method of claim 21, wherein the supplier penalty is set equal to shortage cost.

23. The method of claim 1, wherein the resource sourcing mix is computed based on a rebate.

24. The method of claim 23, wherein the rebate has a value selected based on expected purchase quantity.

25. The method of claim 1, wherein the resource sourcing mix is computed based on a buyer penalty on a flexible quantity contract.

26. The method of claim 25, wherein computing the resource sourcing mix comprises computing fixed and flexible quantity purchases under the flexible quantity contract as separate decision variables.

27. The method of claim 1, wherein computing the resource sourcing mix comprises discounting cash flows.

28. The method of claim 27, wherein each type of cash flow is discounted by a respective discount rate.

29. The method of claim 28, wherein inventory holding costs are discounted by a risk-free discount rate.

30. The method of claim 28, wherein risky cash flows are discounted by a weighted average cost of capital discount rate.

31. The method of claim 1, wherein the resource sourcing mix is computed based on a specified amount of price variability to be passed through to margin.

32. The method of claim 1, wherein computing the resource sourcing mix comprises computing an optimal exercise policy for each forward contract in the portfolio.

33. The method of claim 1, wherein the resource sourcing mix is computed based on:
   a set of demand scenarios for the resource, each demand scenario specifying a respective resource demand forecast over the planning horizon and having an associated demand scenario probability;
   a set of price scenarios for the resource, each price scenario specifying a respective resource price forecast over the planning horizon and having an associated price scenario probability;
   a set of availability scenarios for the resource, each availability scenario specifying a respective resource demand forecast over the planning horizon and having an associated availability scenario probability; and
   a set of one or more forward contract structures each specifying terms of a respective forward contract for procuring the resource from a supplier during the planning horizon.

34. The method of claim 33, wherein computing the resource sourcing mix comprises incorporating correlation between different types of forecast scenarios.

35. The method of claim 34, wherein computing the resource sourcing mix comprises incorporating correlations between availability and price forecast scenarios.

36. The method of claim 34, wherein computing the resource sourcing mix comprises incorporating correlations between availability and demand forecast scenarios.

37. The method of claim 1, wherein computing one or more metrics comprises computing one or more of material cost, shortage cost, total cost, and margin.

38. The method of claim 37, wherein computing one or more metrics comprises computing distributions of net present value for each metric across scenarios.

39. The method of claim 37, wherein computing one or more metrics comprises computing measures comparing performance of different sourcing mixes.

40. The method of claim 39, wherein computing measures comparing different sourcing mixes comprises computing measures comparing a computed optimal sourcing mix and a sourcing mix in which the resource is supplied entirely by spot market purchases.

41. The method of claim 1, wherein computing one or more metrics comprises computing one or more inventory-related metrics.

42. The method of claim 41, wherein computing one or more inventory-related metrics comprises computing for each period and scenario one or more of expected inventory stock, expected value of inventory stock, expected inventory finance and storage cost, expected inventory depreciation cost, and expected total inventory carrying cost.

43. The method of claim 42, wherein computing one or more inventory-related metrics comprises computing for each period and scenario measures of uncertainty for one or more of expected inventory stock and expected value of inventory stock.

44. A procurement risk management system, comprising a calculation engine operable to:
   compute a resource sourcing mix from a sourcing portfolio of one or more forward contracts, spot market purchases, and inventory depletion for each period of a planning horizon based on forecast scenarios for resource demand, resource price, and resource availability and a specified inventory carrying policy for the resource; and
   based upon the computed resource sourcing mix, compute one or more metrics for evaluating the sourcing portfolio.

45. A computer program for managing procurement risk, the computer program residing on a computer-readable medium and comprising computer-readable instructions for causing a computer to:
   compute a resource sourcing mix from a sourcing portfolio of one or more forward contracts, spot market purchases, and inventory depletion for each period of a planning horizon based on forecast scenarios for resource demand, resource price, and resource availability and a specific inventory carrying policy for the resource; and
   based upon the computed resource sourcing mix, compute one or more metrics for evaluating the sourcing portfolio.

* * * * *

UNITED STATES PATENT AND TRADEMARK OFFICE
CERTIFICATE OF CORRECTION

| | | |
|---|---|---|
| PATENT NO. | : 7,747,339 B2 | |
| APPLICATION NO. | : 10/264474 | |
| DATED | : June 29, 2010 | |
| INVENTOR(S) | : Greg C. Jacobus et al. | |

It is certified that error appears in the above-identified patent and that said Letters Patent is hereby corrected as shown below:

In column 39, lines 17-30, in Claim 3, delete "3. A procurement risk management system, comprising a software calculation engine, the software calculation engine implemented as programming on a processor, the software calculation engine, when executed, operable to:
compute a resource sourcing mix from a sourcing portfolio of one or more forward contracts, spot market purchases, and inventory depletion for each period of a planning horizon based on forecast scenarios for resource demand, resource price, and resource availability and a specified inventory carrying policy for the resource; and
based upon the computed resource sourcing mix, compute one or more metrics for evaluating the sourcing portfolio." and
insert -- 3. The method of claim 2, wherein the inventory carrying policy is further specified by a buffer stock level for each period of the planning horizon. --, therefor.

In column 42, lines 4-15, in Claim 44, delete "44. A procurement risk management system, comprising a calculation engine operable to:
compute a resource sourcing mix from a sourcing portfolio of one or more forward contracts, spot market purchases, and inventory depletion for each period of a planning horizon based on forecast scenarios for resource demand, resource price, and resource availability and a specified inventory carrying policy for the resource; and
based upon the computed resource sourcing mix, compute one or more metrics for evaluating the sourcing portfolio." and
insert -- 44. A procurement risk management system, comprising a software calculation engine, the software calculation engine implemented as programming on a processor, the software calculation engine, when executed, operable to:
compute a resource sourcing mix from a sourcing portfolio of one or more forward contracts, spot market purchases, and inventory depletion for each period of a planning horizon based on forecast scenarios for resource demand, resource price, and resource availability and a specified inventory carrying policy for the resource; and Signed and Sealed this
Twenty-eighth Day of December, 2010

David J. Kappos
*Director of the United States Patent and Trademark Office*

CERTIFICATE OF CORRECTION (continued)

U.S. Pat. No. 7,747,339 B2 based upon the computed resource sourcing mix, compute one or more metrics for evaluating the sourcing portfolio. --, therefor.

In column 42, line 25, in Claim 45, delete "specific" and insert -- specified --, therefor.